US008223838B2

(12) United States Patent
Iwata et al.

(10) Patent No.: US 8,223,838 B2
(45) Date of Patent: Jul. 17, 2012

(54) PARALLEL PROCESSING CIRCUIT FOR INTRA-FRAME PREDICTION

(75) Inventors: Kenichi Iwata, Tokyo (JP); Seiji Mochizuki, Tokyo (JP); Tetsuya Shibayama, Tokyo (JP); Fumitaka Izuhara, Tokyo (JP); Hiroshi Ueda, Tokyo (JP); Yukifumi Kobayashi, Tokyo (JP); Hiroaki Nakata, Tokyo (JP); Koji Hosogi, Tokyo (JP); Masakazu Ehama, Tokyo (JP); Takafumi Yuasa, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1348 days.

(21) Appl. No.: 11/834,449

(22) Filed: Aug. 6, 2007

(65) Prior Publication Data

US 2008/0031329 A1 Feb. 7, 2008

(30) Foreign Application Priority Data

Aug. 7, 2006 (JP) .................................. 2006-214869

(51) Int. Cl.
*H04N 7/12* (2006.01)
*H04N 11/02* (2006.01)
*H04N 11/04* (2006.01)
*H04B 1/66* (2006.01)

(52) U.S. Cl. ............................... 375/240.12; 375/240.13
(58) Field of Classification Search ........................ None
See application file for complete search history.

(56) References Cited

U.S. PATENT DOCUMENTS

| 5,701,160 A * | 12/1997 | Kimura et al. ........... 375/240.14 |
| 7,929,614 B2 * | 4/2011 | Cho et al. ................ 375/240.25 |
| 2003/0103564 A1 * | 6/2003 | Hanaki ..................... 375/240.03 |
| 2004/0252768 A1 * | 12/2004 | Suzuki et al. ............ 375/240.24 |
| 2006/0093042 A1 * | 5/2006 | Kashima et al. ......... 375/240.24 |

FOREIGN PATENT DOCUMENTS

EP 1355499 A2 * 10/2003

OTHER PUBLICATIONS

Huang, Y., et al. "Hardware Architecture Design for H.264/AVC Intra Frame Coder," May 2004, Circuits and Systems, 2004. ISCAS '04. Proceedings of the 2004 International Symposium, pp. 269-272.*
Chen, T., et al, "Hardware Architecture Design of an H.264/AVC Video Codec," Jan. 2006, In Proceedings of ACM Asia South pacific Design Automation Conference.*

(Continued)

*Primary Examiner* — Kaveh Abrishamkar
*Assistant Examiner* — Robert Leung
(74) *Attorney, Agent, or Firm* — Miles & Stockbridge P.C.

(57) ABSTRACT

The present invention provides a functional block that executes video coding and video decoding based on H.264/AVC. The functional block includes two moving picture processing units, and a memory unit that stores therein data related to the results of processing of first plural macroblocks arranged within one row of one picture by the first moving picture processing unit. Data related to the results of processing of plural adjacent macroblocks, which are selected from the data stored in the memory unit, are transferred to the second moving picture processing unit. The second moving picture processing unit performs processing of one macroblock of second plural macroblocks arranged in the following row, using the transferred data.

18 Claims, 11 Drawing Sheets

OTHER PUBLICATIONS

Suh, K., et al, "An Efficient Hardware Architecture of Intra Prediction an TQ/IQIT Module for H.264 Encoder," Oct. 2005, ETRI Journal, vol. 27, No. 5, pp. 511-524.*

Jin, G., et al, "An Efficient Pipelined Architecture for H.264/AVC Intra Frame Processing," May 2007, Circuits and Systems, 2007, pp. 1605-1608.*

Thomas Wiegand et al., "Overview of the H.264/AVC Video Coding Standard", IEEE Transactions on Circuits and Systems for Video Technology, Jul. 2003, pp. 1-19.

Gary J. Sullivan et al., "Video Compression—From Concepts to the H.264/AVC Standard", Proceedings of the IEEE, vol. 93, No. 1, Jan. 2005, pp. 18-31.

Hao-Chieh Chang et al., "VLSI Architecture Design of MPEG-4 Shape Coding", IEEE Transactions on Circuits and Systems for Video Technology, vol. 12, No. 9, Sep. 2002, pp. 741-751.

Ihab Amer et al., "Towards MPEG-4 Part 10 System on Chip: A VLSI Prototype for Context-Based Adaptive Variable Length Coding (CALVC)", Signal Processing systems, 2004, SIPS 2004, IEEE Workshop on 2004, pp. 275-279.

Hsiu-Cheng Chang et al., "A Novel Low-Cost High-Performance VLSI Architecture for MPEG-4 AVC/H.264 CALVC Decoding", Circuits and Systems, 2005, ISCAS 2005, IEEE International Symposium on May 23-26, 2005, pp. 6110-6113, vol. 6.

* cited by examiner

PARALLEL PROCESSING CIRCUIT FOR INTRA-FRAME PREDICTION

CROSS-REFERENCE TO RELATED APPLICATIONS

The disclosure of Japanese Patent Application No. 2006-214869 filed on Aug. 7, 2006 including the specification, drawings and abstract is incorporated herein by reference in its entirety.

BACKGROUND OF THE INVENTION

The present invention relates to a functional module which executes at least any one of video coding and video decoding based on ITU-T Recommendation H.264/AVC and a semiconductor integrated circuit including the functional module, and particularly to a technique which makes it easy to perform moving-picture or video parallel processing at intra-frame prediction based on H.264/AVC.

As a video coding system, MPEG (Moving Picture Expert Group)-based video coding system is now prevalent in the world. However, H.246/AVC approved as ITU-T (International Telecommunication Union, Telecommunication Standardization Sector) Recommendation H.264 and approved as International Standard 14496-10 (MPEG part 10) Advanced Video Coding (AVC) by ISO/IEC (International Organization for Standardization/International Electrotechnical Commission) is the latest international standard video coding.

A video coding technology based on Recommendation H.246/AVC has been described in a non-patent document 1 (Thomas Wiegand et al, "Overview of the H.264/AVC Video Coding Standard", IEEE TRANSACTIONS ON CIRCUITS AND SYSTEMS FOR VIDEO TECHNOLOGY, JULY 2003, PP. 1-19). The video coding based on Recommendation H.246/AVC comprises a video coding layer designed so as to express a video context effectively, and a network abstraction layer which formats the VCL representation of the video and provides header information in a manner appropriate for conveyance by a variety of transport layers and storage media.

A non-patent document 2 (GARY J. SULLIVAN et al, "Video Compression—From Concept to the H.264/AVC Standard" PROCEEDING OF THE IEEE, VOL. 93, No. 1, JANUARY 2005, PP. 18-31) has described that a video coding layer (VCL) based on H.246/AVC follows an approach called block-based hybrid vide coding. The VCL design comprises macroblocks, slices and slice blocks. Each picture is divided into a plurality of fixed-size macroblocks. The respective macroblocks include square picture areas of 16×16 samples as luminance components, and square sample areas corresponding thereto provided for two color-difference components respectively. One picture can contain one or more slices. Each slice is self-inclusive in a sense that it provides an active sequence and a picture parameter set. Since the slice representation can basically be decoded without using information given from other slices, syntax elements can be analyzed from a bit stream and the values of samples in a picture area. In order to obtain more complete decoding, however, several information from other slices are required to adapt a deblocking filter over a slice boundary. The non-patent document 2 has also described that since the respective slices are encoded and decoded independent of other picture's slices, they can be used in parallel processing.

On the other hand, in a system that deals with video codes, an image size has been made large-screen as in the case of a digital HDTV (High Definition Television) broadcast receiver, a digital video camera capable of imaging HDTV signals, or the like. An image coding device and an image decoding device need increasingly higher processing performance.

SUMMARY OF THE INVENTION

Prior to the present invention, the present inventors have been involved in the development of a low power-consumption functional block which executes video coding and video decoding based on the H.264/AVC.

Upon this development, the basic design that moving-picture or video parallel processing is adopted to process large-screen video coding and decoding for HDTV in high throughput capacity without increasing an operating frequency, was first considered. This basically coincides with the description of the non-patent document 2 that "since the respective slices based on H.264/AVC are encoded and decoded independent of other picture's slices, they can be parallel-processed".

However, the present inventors have investigated, in further detail, the parallel processing of the functional block that executes the video coding and decoding based on the H.264/AVC. As a result, the following problems and direction in advanced design have been revealed.

As data parallel-processed by a plurality of moving picture parallel processing units that constitute the above functional block, each slice contains a plurality of macroblocks of 16×16 samples as luminance components. Therefore, one slice is excessively large. On the other hand, since each slice corresponds to one sequence for the plural macroblocks processed in the order of raster scan from top-left to bottom-right of each picture, the macroblock smaller in data quantity than the slice is set as the unit of each of the data parallel-processed by the plurality of moving picture parallel processing units. The moving picture parallel processing units sequentially process one sequence of the plural macroblocks.

There is however a need to allow the parallel processing by the plurality of moving picture parallel processing units with each macroblock as the data unit to correspond to intra-frame prediction provided for the video coding layer of H.264/AVC. In the intra-frame prediction corresponding to one technical element for video coding inside one picture, each macroblock having a square picture area of 16×16 samples as luminance components might be divided into 16 blocks of 4×4 samples.

FIG. 2 is a diagram showing slices of one picture based on H.264/AVC, partition into macroblocks and intra-frame prediction. As shown in the same drawing, one picture is divided into, for example, a plurality of slices #0, #1 and #2. One slice #0 is divided into 32 microblocks corresponding to MB000 through MB207. All the macroblocks MB000 through MB811 of one picture respectively include square picture areas of 16×16 samples for luminance components and 8×8 sample areas respectively provided for two color-difference components, corresponding thereto.

FIG. 3 is a diagram showing the manner of a prediction mode PM in which one block of 4×4 samples is predicted spatially from samples adjacent thereto at the intra-frame prediction based on H.264/AVC. As shown in the same drawing, 16 samples of 4×4 blocks from symbols a to p can be predicted using samples previously decoded in adjacent blocks labeled as symbols A to Q. Further, the prediction mode PM includes nine 4×4 prediction modes as shown in FIG. 3. In the mode 0 (vertical prediction), the corresponding sample is predicted from values copied as indicated by arrows from samples of blocks above the 4×4 blocks. In the mode 1 (horizontal prediction), the corresponding sample is predicted from values copied as indicated by arrows from samples of blocks on the left side of the 4×4 blocks. In the mode 2 (DC prediction), the corresponding sample is predicted from the average of effective pixels of the blocks above the 4×4 blocks and the blocks on the left side thereof. In the mode 3 (lower left diagonal prediction), the corresponding sample is predicted as indicated by arrows from upper right diagonal samples. In the mode 4 (lower right diagonal prediction), the corresponding sample is predicted as indicated by arrows from upper left diagonal samples. In the mode 5 (lower right vertical prediction), the corresponding sample is predicted as indicated by arrows from upper left diagonal samples. In the mode 6 (lower right horizontal prediction), the corresponding sample is predicted as indicated by arrows from upper left diagonal samples. In the mode 7 (lower left vertical prediction), the corresponding sample is predicted as indicated by arrows from upper right diagonal samples. In the mode 8 (upper right horizontal prediction), the corresponding sample is predicted as indicated by arrows from lower left diagonal samples.

It has been revealed by the investigations of the present inventors that high-speed data transfer of samples previously decoded in adjacent blocks between a plurality of moving picture parallel processing units is required to cause the parallel processing by the plurality of moving picture parallel processing units with the above macroblocks as the data units to cope with the intra-frame prediction based on H.264/AVC shown in FIG. 3.

Assume that as shown in FIG. 2, for example, a first moving picture processing unit that constitutes a functional block sequentially processes the macroblocks MB000 . . . , MB200 . . . , MB400 arranged in even-numbered rows of a 0thh row, a second row, a fourth row, . . . of one picture, whereas a second moving picture processing unit sequentially processes the macro blocks MB100 . . . , MB300 . . . , MB500 arranged in odd-numbered rows of a first row, a third row, a fifth row . . . of the one picture. In doing so, the second moving picture processing unit needs data processed by the first moving picture processing unit when it processes the macroblock MB707 arranged in the seventh row as indicated in the lower right corner of FIG. 2. An example is shown in which 16 samples of 4×4 blocks in the upper left corner of the macroblock MB707 and 16 samples of 4×4 blocks in the upper right corner thereof are intraframe-predicted. Further, it is assumed that the macroblocks MB606, MB607 and MB608 that need copies of data at this time are all intra 4×4-predicted macroblocks.

When the 4×4 blocks located in the upper left corner of the macroblock MB707 are predicted in the mode 4 (lower right diagonal prediction) of FIG. 3, the first moving picture processing unit needs to transfer data of one sample at the lower right of the macroblock MB606 arranged in the sixth row, data of 1×4 samples at the lower left of the macroblock MB607 and data of 4×1 samples generated by processing of 4×4 blocks at the upper right of the macroblock MB706 arranged in the seventh row by the second moving picture processing unit to the second moving picture processing unit. When the 4×4 blocks at the upper right of the macroblock MB707 are predicted in the mode 3 (lower left diagonal prediction) of FIG. 3, the first moving picture processing unit needs to transfer and copy data of 1×4 samples at the lower right of the macroblock MB607 arranged in the sixth row and data of 1×4 samples at the lower left of the macroblock MB608 arranged in the sixth row to the second moving picture processing unit upon processing of the 4×4 blocks at the upper right of the macroblock MB707 arranged in the seventh row by the second moving picture processing unit. The copy of the data from the macroblock MB706 can easily be realized by disposing memories such as data copying registers inside the second moving picture processing unit. However, the copy of the data from the macroblocks MB606, MB607 and MB608 need complex control that the first moving picture processing unit stores the three data generated by processing of the three 4×4 blocks in the three macroblocks MB606, MB607 and MB608 arranged in the sixth row in their corresponding memories such as data copying registers disposed inside the first moving picture processing unit and thereafter transfers the data to the second moving picture processing unit for performing the processing of intra-frame prediction of the macroblock MB707 of the seventh row at high speed. That is, it is necessary to complete the data transfer of decoding processing of the macroblock MB608 by the first moving picture processing unit and the result of its decoding processing to the second moving picture processing unit at the start of processing for the intra-frame prediction of the macroblock MB707 by the second moving picture processing unit.

Then, the first moving picture processing unit needs data about decoding processing results of the macroblocks MB706, MB707 and MB708, which are processed by the second moving picture processing unit, upon the start of processing for intra-frame prediction of the macroblock MB807.

At H.264/AVC as described above, the macroblocks arranged in the lower rows in one slice of one picture depend upon the results of processing of the adjacent macroblocks arranged in the upper rows in the same slice.

Thus, an object of the present invention is to facilitate parallel processing by a plurality of moving picture parallel processing units upon adaptation of the parallel processing by the plurality of moving picture parallel processing units with macroblocks as data units to intra-frame prediction constituting a video coding layer of H.264/AVC.

On the other hand, HDTV having a large screen with 1920 pixels at a maximum as viewed in the horizontal direction and 1080 scanning lines at a maximum as viewed in the vertical direction has two scan modes as well known. The first is an interlace scan based on alternate scanning lines, and the second is a progressive scan based on continuous scanning lines.

A coding video sequence of the video decoding layer of H.264/AVC is also adaptive to an interlace scan signal and has a field picture, a frame picture and a macroblock adaptive frame/field-coded frame picture.

FIG. 6 is a diagram showing a macroblock adaptive frame/field-coded frame picture PF and field picture IF which are defined in a VCL coding video sequence of H.264/AVC. In the field picture IF as shown in the same drawing, a top field TF containing even-numbered rows and a bottom field BF containing odd-numbered rows are coded discretely.

FIG. 7 is a diagram showing the manner in which a first moving picture processing unit Codec_EL_0 and a second moving picture processing unit Codec_EL_1 operated in parallel process a plurality of macroblocks where a coding video sequence of VCL of H.264/AVC is a macroblock adaptive frame/field-coded frame picture PF. In the macroblock adaptive frame/field-coded frame picture PF, a sequence for macroblocks of an even-numbered row and a sequence for macroblocks of an odd-numbered row are coded as a macroblock pair MBP comprising one macroblock MB000 of the even-numbered row in the same column as viewed in the horizontal direction, and one macroblock MB100 of the odd-numbered row. Thus, the two moving picture processing units Codec_EL_0 and Codec_EL_1 efficiently parallel-process macroblock pairs MPB as data units. A method of performing intra-frame prediction at the parallel processing with the macroblock pair MBP as the data unit is shown as indicated by arrows at the upper left of FIG. 7.

On the other hand, FIGS. 11 and 12 are respectively diagrams illustrating the manner in which a first moving picture processing unit Codec_EL_0 and a second moving picture processing unit Codec_EL_1 operated in parallel process a plurality of macroblocks in a time zone of a top field TF containing only rows of even numbers and a time zone of a bottom field BF containing only rows of odd numbers where a VCL coding video sequence of H.264/AVC is a field picture IF. Even in both cases, each data unit parallel-processed by the two moving picture processing units Codec_EL_0 and Codec_EL_1 becomes one macroblock MB other than the macroblock pair MBP shown in FIG. 7. A method of performing intra-frame prediction at parallel processing with the macroblock MB as the data unit is shown as indicated by upper left arrows in FIGS. 11 and 12. This results in a method similar to the progressive sequence shown in FIG. 2.

Accordingly, the functional block that executes the video coding and decoding based on H.264 needs to be able to adapt to both of the macroblock adaptive frame/field-coded frame picture and field picture different in unit at the parallel processing.

Thus, another object of the present invention is to allow parallel processing by a plurality of moving picture parallel processing units with a macroblock as a data unit to correspond or adapt to both of a macroblock adaptive frame/field-coded frame picture and field picture corresponding to a coding video sequence of a video coding layer based on H.264/AVC.

A further object of the present invention is to provide a semiconductor integrated circuit including a core capable of facilitating parallel processing by a plurality of moving picture parallel processing units upon adaptation of the parallel processing by the plurality of moving picture parallel processing units with each macroblock as a data unit to intra-frame prediction constituting a video coding layer of H.264/AVC.

The above, other objects and novel features of the present invention will become apparent from the description of the present specification and the accompanying drawings.

Summaries of representative ones of the inventions disclosed in the present application will be explained in brief as follows:

A functional block (FB) capable of executing at least any one of video coding and video decoding based on H.264/AVC according to one embodiment of the present invention includes at least a first moving picture processing unit (Codec_EL_0; 2_0) and a second moving picture processing unit (Codec_EL_1; 2_1) capable of parallel operations (see FIG. 1).

Upon execution of the parallel operations by the first moving picture processing unit (Codec_EL_0; 2_0) and the second moving picture processing unit (Codec_EL_1; 2_1), a data processing unit processed by each of the first moving picture processing unit (Codec_EL_0; 2_0) and the second moving picture processing unit (Codec_EL_1; 2_1) includes macroblocks having a plurality of sample numbers (see FIG. 2).

The first moving picture processing unit (Codec_EL_0) sequentially processes first plural macroblocks (MB600 . . . MB606, MB607, MB608 . . . MB611) arranged within one row of one picture, and the second moving picture processing unit (Codec_EL_1) sequentially processes second plural macroblocks (MB700 . . . MB706, MB707, MB708 . . . MB711) arranged within another row different from the one row of the one picture (see FIGS. 2 and 4).

Data related to results of processing of the plural adjacent macroblocks (MB606, MB607 and MB608) of the first plural macroblocks (MB600 . . . MB606, MB607, MB608 . . . MB611), which are located in the neighborhood of one macroblock (MB707) of the second plural macroblocks (MB700 . . . MB706, MB707, MB708 . . . MB711), by the first moving picture processing unit (Codec_EL_0), are used upon intra-frame prediction for processing of the one macroblock (MB707) of the second plural macroblocks (MB700, MB706, MB707, MB708 . . . MB711) by the second moving picture processing unit (Codec_EL_1) (see FIGS. 2 and 4).

The functional block (FB) capable of executing at least any one of the video coding and video decoding based on H.264/AVC further includes a memory unit (LM) which is coupled to the first moving picture processing unit (Codec_EL_0) and the second moving picture processing unit (Codec_EL_1) and stores therein data related to results of processing of the first plural macroblocks (MB600 . . . MB606, MB607, MB608 . . . MB611) arranged within the one row of the one picture by the first moving picture processing unit (Codec_EL_0) (see FIG. 1).

The data related to the results of processing of at least the plural adjacent macroblocks (MB606, MB607 and MB608) by the first moving picture processing unit (Codec_EL_0), which are selected from within the data related to the results of processing stored in the memory unit (LM), are transferred from the memory unit (LM) to the second moving picture processing unit (Codec_EL_1) prior to the start of processing for the intra-frame prediction for the processing of the one macroblock (MB707) of the second plural macroblocks (MB700 . . . MB706, MB707, MB708 . . . MB711) by the second moving picture processing unit (Codec_EL_1) (see FIG. 4).

According to the means of the one embodiment of the present invention, the initial objects can be achieved by the following operations.

Prior to the processing start of the intra-frame prediction for the processing of the one macroblock (MB707) of the second plural macroblocks (MB700 . . . MB706, MB707, MB708 . . . MB711) by the second moving picture processing unit (Codec_EL_1), the data related to the results of processing of at least the plural adjacent macroblocks (MB606, MB607 and MB608) located in the neighborhood of the one macroblock (MB707) by the first moving picture processing unit (Codec_EL_0) have already been transferred from the memory unit (LM) to the second moving picture processing unit (Codec_EL_1). As a result, the parallel processing by the first moving picture processing unit (Codec_EL_0) and the second moving picture processing unit (Codec_EL_1) is facilitated.

In a functional block (FB) according to one preferred form of the present invention, a result of processing of one macroblock (e.g., MB607) of the plural adjacent macroblocks (MB606, MB607 and MB608) is selected in accordance with a prediction mode (mode 0 in FIG. 3, for example) used for the intra-frame prediction of the one macroblock (MB707) from the data related to the results of processing of the plural adjacent macroblocks (MB606, MB607 and MB608) by the first moving picture processing unit (Codec_EL_0), which have been transferred from the memory unit (LM) prior to the processing start of the intra-frame prediction for the processing of the one macroblock (MB707) of the second plural macroblocks (MB700 . . . MB706, MB707, MB708 . . . MB711) by the second moving picture processing unit (Codec_EL_1). The second moving picture processing unit (Codec_EL_1) executes the processing of the one macroblock (e.g., MB707) of the second plural macroblocks (MB700 . . . MB706, MB707, MB708 . . . MB711) using the selected result of processing.

According to the means of the one preferred form of the present invention, when the second moving picture processing unit (Codec_EL_1) performs the intra-frame prediction of the one macroblock (MB707), it immediately selects the required result of processing from the data already transferred from the memory unit to the second moving picture processing unit (Codec_EL_1) in accordance with the corresponding prediction mode. And the second moving picture processing unit (Codec_EL_1) can immediately execute processing of the one macroblock (e.g., MB707) using the selected result of processing. Executing the transfer of the data between the plurality of moving picture parallel processing units in this way makes it possible to realize intra-frame prediction that constitutes a video coding layer based on H.264/AVC at high speed.

In a functional block (FB) according to one specific form of the present invention, the first moving picture processing unit (Codec_EL_0) and the second moving picture processing unit (Codec_EL_1) respectively include memories (3_0_Reg and 3_1_Reg) that store therein data related to the results of processing of macroblocks (MB606 and MB706). The first moving picture processing unit (Codec_EL_0) and the second moving picture processing unit (Codec_EL_1) respectively use the data stored in the memories (3_0_Reg and 3_1_Reg) and related to the results of processing of the macroblocks (MB606 and MB706) upon intra-frame prediction for processing of succeeding macroblocks (MB607 and MB707) immediately following the macroblocks (MB606 and MB706) (see FIGS. 1 and 2).

According to the means of the one specific form of the present invention, if the prediction mode used in the intra-frame prediction is of the mode 1 (horizontal prediction) of FIG. 3, then the data stored in the memories (3_0_Reg and 3_1_Reg) and related to the results of processing of the macroblocks (MB606 and MB706) can be used in the intra-frame prediction upon the processing of the succeeding macroblocks (MB607 and MB707).

In a functional block (FB) according to one specific form of the present invention, the first moving picture processing unit (Codec_EL_0) and the second moving picture processing unit (Codec_EL_1) are respectively constituted by pipeline connections of a plurality of functional subunits (3_0, 4_0, 5_0; 3_1, 4_1, 5_1) operated with timings different from one another in function and different in pipeline operation so as to execute selected one processing of the video coding and the video decoding. The timing provided to start the pipeline operation of the second moving picture processing unit (Codec_EL_1) is delayed by two time slots (2TS) or more of the pipeline operation from the timing provided to start the pipeline operation of the first moving picture processing unit (Codec_EL_0) (see FIG. 4).

According to the means of the one specific form of the present invention, the processing of one macroblock (MB608) of the first plural macroblocks (MB600 . . . MB606, MB607, MB608, . . . MB611) by the first moving picture processing unit (Codec_EL_0) is executed in a first time slot (TS) of the pipeline operation. Data related to the result of processing thereof is stored in the corresponding memory unit (LM). The data related to the result of processing can be transferred from the memory unit (LM) to the second moving picture processing unit (Codec_EL_1) in a second time slot (TS) of the pipeline operation. As a result, upon intra-frame prediction for the processing of the one macroblock (MB707) of the second plural macroblocks (MB700 . . . MB706, MB707 MB708 . . . MB711) by the second moving picture processing unit (Codec_EL_1) in a third time slot (TS) of the pipeline operation, data related to the result of processing of one adjacent macroblock (MB608) selected from the plural adjacent macroblocks (MB606, MB607 and MB608) located in the neighborhood of the one macroblock (MB707) by the first moving picture processing unit (Codec_EL_0) can be used.

Further, according to the means of the one specific form of the present invention, the processing of one macroblock (MB002) of the first plural macroblocks (MB000, MB001, MB002 . . . MB006, MB007, MB008 . . . MB011) arranged in a 0th row by the first moving picture processing unit (Codec_EL_0) is executed in a first time slot (TS) of the pipeline operation even at both top and bottom fields of a field picture. Data related to the result of processing thereof is stored in the corresponding memory unit (LM). The data related to the result of processing can be transferred from the memory unit (LM) to the second moving picture processing unit (Codec_EL_1) in a second time slot TS of the pipeline operation. As a result, upon intra-frame prediction for the processing of one macroblock (MB101) of the second plural macroblocks (MB100, MB101, MB102 . . . MB106, MB107, MB108 . . . MB111) arranged in a first row, by the second moving picture processing unit (Codec_EL_1) in a third time slot TS of the pipeline operation, data related to the result of processing of one adjacent macroblock (MB002) selected from the plural adjacent macroblocks (MB000, MB001 and MB002) located in the neighborhood of the one macroblock (MB101), by the first moving picture processing unit (Codec_EL_0) can be used. Thus, the functional block can be adapted even to both the top and bottom fields of the field picture corresponding to the coding video sequence of the video coding layer of H.264/AVC (see FIG. 13).

In a functional block (FB) according to one specific form of the present invention, the first moving picture processing unit (Codec_EL_0) processes respective sets of macroblock pairs (MBP) of the same rows in first plural macroblocks (MB000 . . . MB006, MB007, MB008 . . . MB011) arranged within one row of one picture and second plural macroblocks (MB100 . . . MB106, MB107, MB108 . . . MB111) arranged within a first succeeding row located immediately after the one row as data units. The second moving picture processing unit (Codec_EL_1) processes respective sets of macroblock pairs (MBP) of the same rows in third plural macroblocks (MB200 . . . MB206, MB207, MB208 . . . MB211) arranged within a second succeeding row located immediately after the first succeeding row, and fourth plural macroblocks (MB300 . . . MB306, MB307, MB308 . . . MB311) arranged within a third succeeding row located immediately after the second succeeding row as data units. The first moving picture processing unit (Codec_EL_0) and the second moving picture processing unit (Codec_EL_1) are respectively constituted by pipeline connections of plural functional subunits (3_0, 4_0, 5_0; 3_1, 4_1, 5_1) operated with timings different from one another in function and different in pipeline operation so as to execute selected one processing of the video coding and the video decoding. The timing provided to start the pipeline operation of the second moving picture processing unit (Codec_EL_1) is delayed by four time slots (4TS) or more of the pipeline operation from the timing provided to start the pipeline operation of the first moving picture processing unit (Codec_EL_0) (see FIG. 10).

According to the means of the one specific form of the present invention, the processing of one macroblock (MB000) of the first plural macroblocks (MB000 . . . MB006, MB007, MB008 . . . MB011) arranged in one row of one picture by the first moving picture processing unit (Codec_EL_0) is executed in the first time slot (TS) of the pipeline operation. The processing of one macroblock (MB100) of the second plural macroblocks (MB100 ... MB106, MB107, MB108 ... MB111) arranged in the first succeeding row by the first moving picture processing unit (Codec_EL_0) is executed in the second time slot (TS) of the pipeline operation. Consequently, the processing of one macroblock pair (MBP) constituted of the two macroblocks (MB000 and MB100) is completed. The processing of one succeeding macroblock (MB001) of the first plural macroblocks (MB000 ... MB006, MB007, MB008 ... MB011) arranged within one row by the first moving picture processing unit (Codec_EL_0) is executed in the third time slot (TS) of the pipeline operation. The processing of one succeeding macroblock (MB101) of the second plural macroblocks (MB100 ... MB106, MB107, MB108 ... MB111) arranged in the first succeeding row by the first moving picture processing unit (Codec_EL_0) is executed in the fourth time slot (TS) of the pipeline operation. Thus, the processing of one macroblock pair (MBP) constituted of the two macroblocks (MB001 and MB101) is completed. Further, data related to these processes are stored in the memory unit (LM). Upon intra-frame prediction for the processing of the macroblock pair (MBP) including one macroblock (MB200) of the third plural macroblocks (MB200 ... MB206, MB207, MB208 ... MB211) arranged in the second succeeding row located immediately after the first succeeding row in the fifth time slot (TS) of the pipeline operation, the second moving picture processing unit (Codec_EL_1) can make use of data related to the results of processing of the plural adjacent macroblock pairs (MB000, MB100, MB001 and MB101) located near the macroblock pair (MBP) by the first moving picture processing unit (Codec_EL_0). As a result, the functional block FB can be adapted even to the processing of a macroblock adaptive frame/field-coded frame picture corresponding to a coding video sequence of a video decoding layer of H.264/AVC (see FIG. 10).

In a functional block (FB) according to one specific form of the present invention, the first moving picture processing unit (Codec_EL_0) and the second moving picture processing unit (Codec_EL_1) are respectively constituted by pipeline connections of plural functional subunits (3_0, 4_0, 5_0; 3_1, 4_1, 5_1) operated with timings different from one another in function and different in pipeline operation so as to execute selected one processing of the video coding and the video decoding, and a cascade connection of a plurality of input/output interfaces (10_30, 10_40, 10_50; 10_31, 10_41, 10_51) respectively coupled to the plural functional subunits (3_0, 4_0, 5_0; 3_1, 4_1, 5_1). The input/output interfaces (10_30, 10_40, 10_50; 10_31, 10_41, 10_51) transfer data related to the results of processing of macroblocks by either the first moving picture processing unit (Codec_EL_0) or the second moving picture processing unit (Codec_EL_1). The other end of the cascade connection of the input/output interfaces (10_30, 10_40, 10_50) of the first moving picture processing unit (Codec_EL_0) is coupled to one end of the cascade connection of the input/output interfaces (10_31, 10_41, 10_51) of the second moving picture processing unit (Codec_EL_1) via a first data path (9_0). The other end of the cascade connection of the input/output interfaces (10_31, 10_41, 10_51) of the second moving picture processing unit (Codec_EL_1) is coupled to its corresponding input of the memory unit (LM) via a second data path (9_1). The output of the memory unit (LM) is coupled to one end of the cascade connection of the input/output interfaces (10_30, 10_40, 10_50) of the first moving picture processing unit (Codec_EL_0) via a third data path (9_2) (see FIG. 1).

According to the means of the one specific form of the present invention, the plural input/output interfaces (10_30, 10_40, 10_50; 10_31, 10_41, 10_51) of the first moving picture processing unit (Codec_EL_0) and the second moving picture processing unit (Codec_EL_1), the memory unit (LM), the first data path (9_0), the second data path (9_1), and the third data path (9_2) constitute a ring data path. Therefore, the transfer of data used in intra-frame prediction can be facilitated between the first moving picture processing unit (Codec_EL_0) and the second moving picture processing unit (Codec_EL_1) (see FIG. 1).

In a functional block (FB) according to one specific form of the present invention, the input/output interfaces (10_30, 10_40, 10_50; 10_31, 10_41, 10_51) respectively discriminate whether the corresponding subunits (3_0, 4_0, 5_0; 3_1, 4_1, 5_1) use the transferred data related to the results of processing of the macroblocks. When the subunits use the same, the input/output interfaces supply the data to the corresponding subunits (3_0, 4_0, 5_0; 3_1, 4_1, 5_1) (see FIG. 5).

A functional block (FB) according to one specific form of the present invention further includes a controller (CNT) which analyzes a bit stream (BS) containing the first plural macroblocks and the second plural macroblocks and thereby supplies the first plural macroblocks to the first moving picture processing unit (Codec_EL_0) and supplies the second plural macroblocks to the second moving picture processing unit (Codec_EL_1) (see FIG. 1).

A functional block (FB) according to one specific form of the present invention further includes a direct memory access controller (DMAC) which transfers the bit stream (BS) between a storage device (external SDRAM) and the first and second moving picture processing units (Codec_EL_0 and Codec_EL_1) (see FIG. 16).

In a functional block (FB) according to another specific form of the present invention, the functional subunits (3_0, 4_0, 5_0; 3_1, 4_1, 5_1) of the first moving picture processing unit (Codec_EL_0) and the second moving picture processing unit (Codec_EL_1) are constituted of common hardware resources usable in the video decoding and the video coding. An operation mode signal (EN/DEC) for instructing a system initialization sequence to operate the functional block (FB) as either a coding device or a decoding device is supplied. Each of the common hardware resources is operated as a device instructed by the operation mode signal (EN/DEC) in response to the instruction based on the operation mode signal (EN/DEC) (see FIG. 1).

In a functional block (FB) according to a further specific form of the present invention, the memory unit (LM) is a line memory that stores therein the data corresponding to the one row, related to the results of processing of the first plural macroblocks (MB600 ... MB606, MB607, MB608, ... MB611) arranged within the one row of the one picture by the first moving picture processing unit (Codec_EL_0) (see FIG. 1).

According to the most specific form of the present invention, the functional block (FB) is configured over a chip of a semiconductor integrated circuit as a core (see FIG. 1).

Advantageous effects obtained by representative ones of the invention disclosed in the present application will be explained in brief as follows:

According to the present invention, parallel processing of a plurality of moving picture parallel processing units can be facilitated upon allowing the parallel processing by the plurality of moving picture parallel processing units with a macroblock as a data unit to correspond or adapt to intra-frame prediction constituting a video coding layer based on H.264/AVC.

According to the present invention as well, parallel processing by a plurality of moving picture parallel processing units with a macroblock as a data unit can also be caused to correspond or adapt even to both of a macroblock adaptive frame/field-coded frame picture and field picture corresponding to a coding video sequence of a video coding layer based on H.264/AVC.

Further, according to the present invention, it is also possible to provide a semiconductor integrated circuit including a core capable of facilitating parallel processing by a plurality of moving picture processing units upon allowing the parallel processing by the plurality of moving picture parallel processing units with a macroblock as a data unit to adapt to infra-frame prediction constituting a video coding layer of H.264/AVC.

DETAILED DESCRIPTION OF THE PREFERRED EMBODIMENTS

<<Configuration of Functional Block>>

Figure 1:
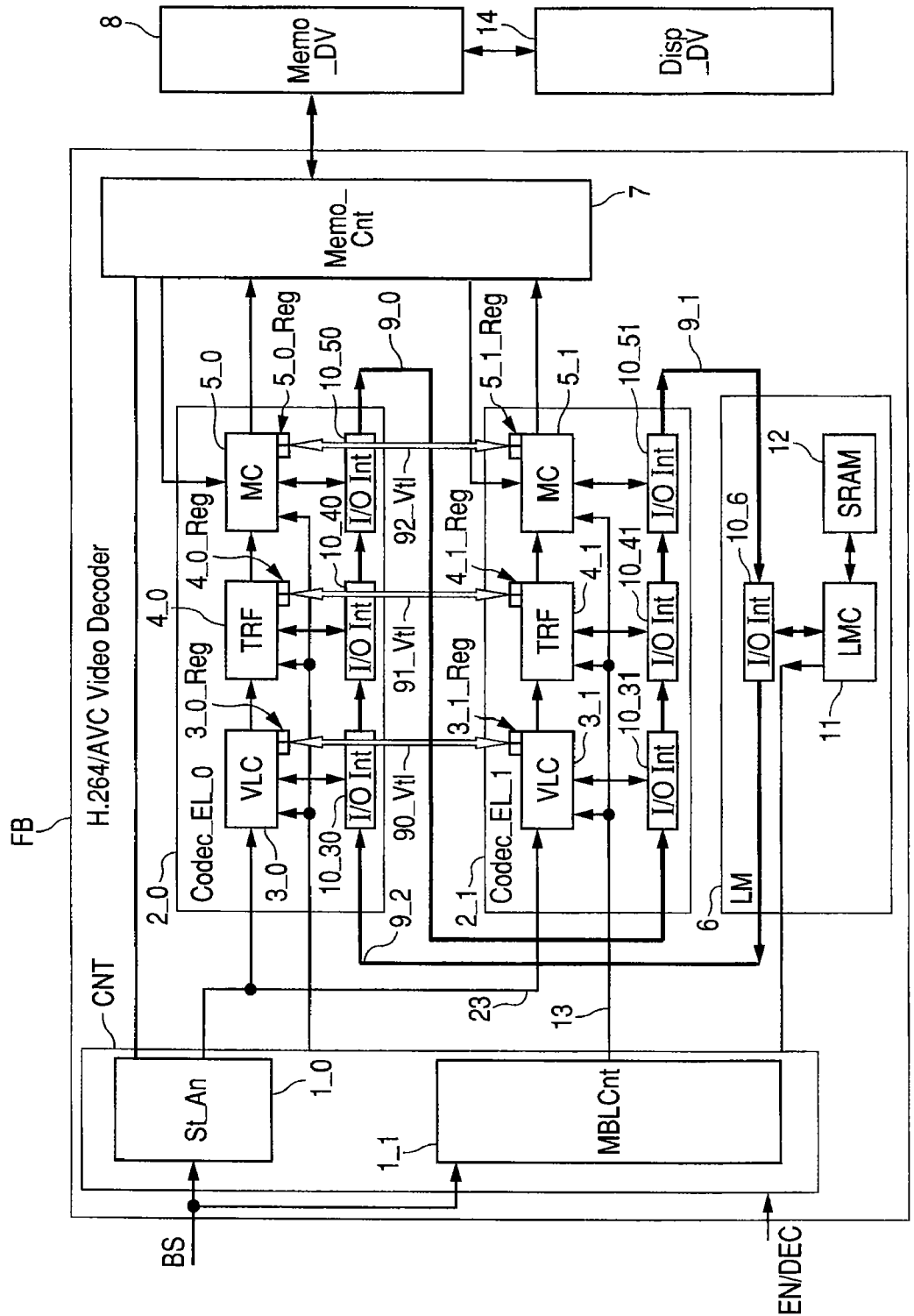
FIG. 1 is a diagram showing a functional block that executes both of video coding and video decoding based on H.264 according to one embodiment of the present invention.

FIG. 1 is a diagram showing a functional block FB which executes both of moving-picture or video coding and moving-picture or video decoding based on H.264 according to one embodiment of the present invention.

The functional block FB is configured over a chip of a semiconductor integrated circuit as an IP (Intellectual Property) core of a moving picture processing semiconductor integrated circuit such as a cellular phone terminal, a digital camera or the like. In FIG. 1, an operation mode signal DEC of a level or bit pattern for instructing a system initialization sequence of the functional block FB at, for example, power-on or power-on reset to operate the functional block FB as a decoder is supplied. As a result, common hardware resources $3\_0, 4\_0, 5\_0$ and $3\_1, 4\_1$ and $5\_1$ respectively constituting a first moving picture processing unit Codec_EL_0 ($2\_0$) and a second moving picture processing unit Codec_EL_1 ($2\_1$) are operated as decoders in response to the instruction based on the operation mode signal DEC. When an operation mode signal EN of another level or bit pattern for instructing the system initialization sequence to operate the functional block FB as an encoder is supplied, the common hardware resources $3\_0, 4\_0, 5\_0$ and $3\_1, 4\_1$ and $5\_1$ respectively constituting the first moving picture processing unit Codec_EL_0 ($2\_0$) and the second moving picture processing unit Codec_EL_1 ($2\_1$) are operated as encoders.

In FIG. 1, moving-picture or vide coding data based on H.264 is supplied from media such as hard disk drive (HDD), optical disk drive, a mass-storage non-volatile flash memory, a wireless LAN (Local Area Network), etc. to the functional block FB used as the decoder in the form of a bit stream BS. The video coding data is decoded by the functional block BS and the so-decoded data is stored in a memory device 8. A moving picture can be displayed by a display device 14.

As shown in FIG. 1, the functional block FB includes a controller CNT which analyzes the bit stream BS containing a plurality of macroblocks and thereby supplies the first plural macroblocks to the first moving picture processing unit Codec_EL_0 ($2\_0$) and supplies the second plural macroblocks to the second moving picture processing unit Codec_EL_1 ($2\_1$).

The controller CNT includes a stream analysis unit ST_An ($1\_0$) which supplies macroblocks to the first moving picture processing unit Codec_EL_0 ($2\_0$) and the second moving picture processing unit Codec_EL_1 ($2\_1$), and a macroblock pipeline control unit MBLCnt ($1\_1$) which controls parallel pipeline operations of the first moving picture processing unit Codec_EL_0 ($2\_0$) and the second moving picture processing unit Codec_EL_1 ($2\_1$) through a control signal line 13.

When the first moving picture processing unit Codec_EL_0 ($2\_0$) and the second moving picture processing unit Codec_EL_1 ($2\_1$) are operated in parallel, a data processing unit processed by the first moving picture processing unit Codec_EL_0 (2_0) and the second moving picture processing unit Codec_EL_1 (2_1) contains macroblocks MB000 . . . MB811 having the number of samples corresponding to 16×16 as shown in FIG. 2.

Figure 2:
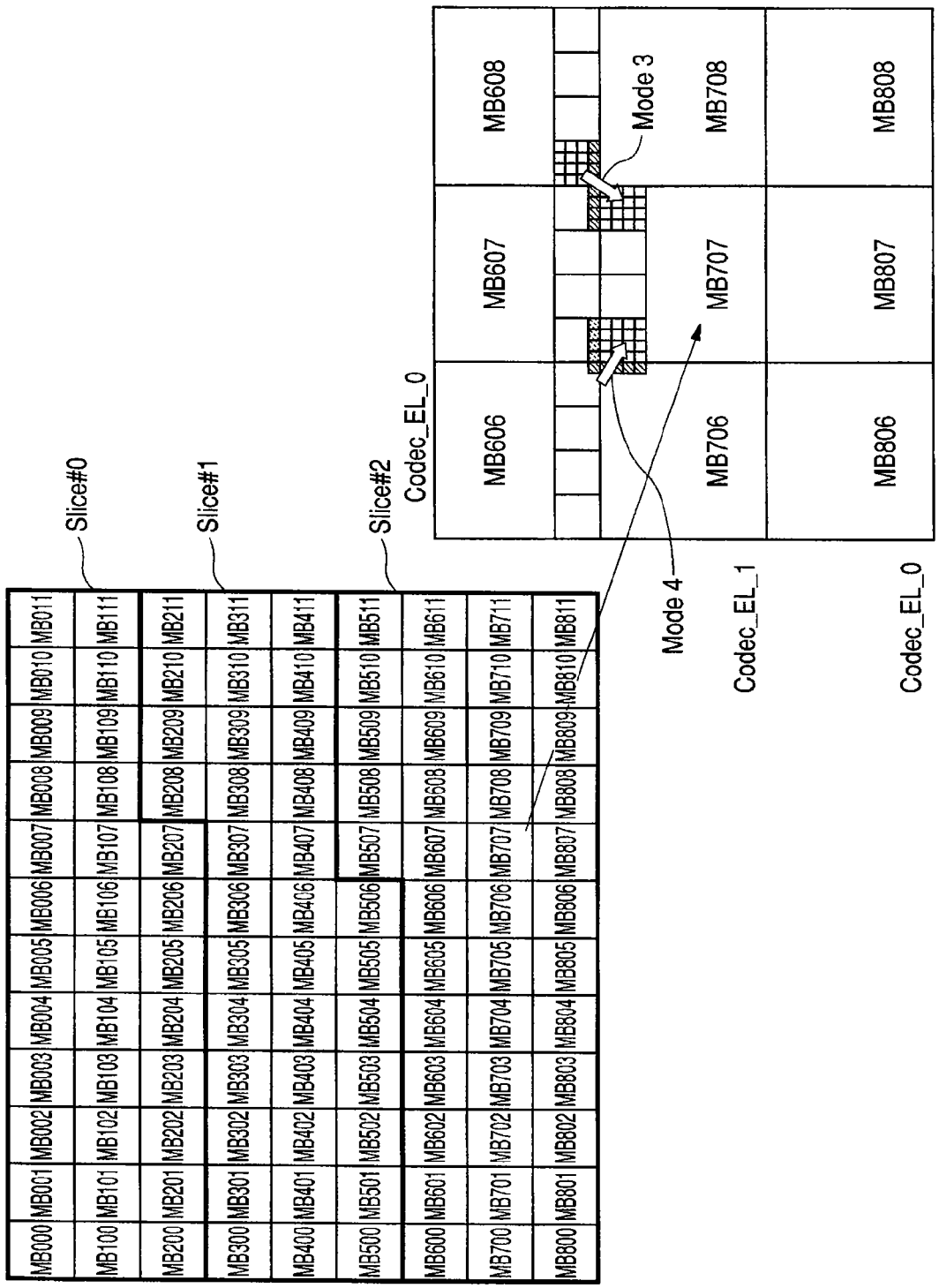
FIG. 2 is a diagram illustrating slices of one picture based on H.264/AVC, partition into macroblocks and intra-frame prediction.

As shown in FIG. 2, the first moving picture processing unit Codec_EL_0 (2_0) sequentially processes the first plural macroblocks MB000 . . . MB200 . . . MB400 . . . MB600 . . . MB606, MB607, MB608 . . . MB611 arranged within or in even-numbered rows of a 0thh row, a second row, a fourth row . . . of one picture in the direction of a raster scan. The second moving picture processing unit Codec_EL_1 (2_1) sequentially processes the second plural macroblocks MB100 . . . MB300 . . . MB500 . . . MB700 . . . MB706, MB707, MB708 . . . MB711 arranged within or in odd-numbered rows of a first row, a third row, a fifth row . . . of the same one picture in the direction of the raster scan. As shown in FIG. 2, one picture is divided into, for example, a plurality of slices Slice#0, Slice#1 and Slice#2, and one slice Slice#0 is divided into 32 macroblocks of MB000 through MB207. All macroblocks MB000 through MB811 of one picture respectively include square picture areas of 16×16 samples as luminance components, and sample areas respectively provided for two color-difference components corresponding thereto.

Figure 3:
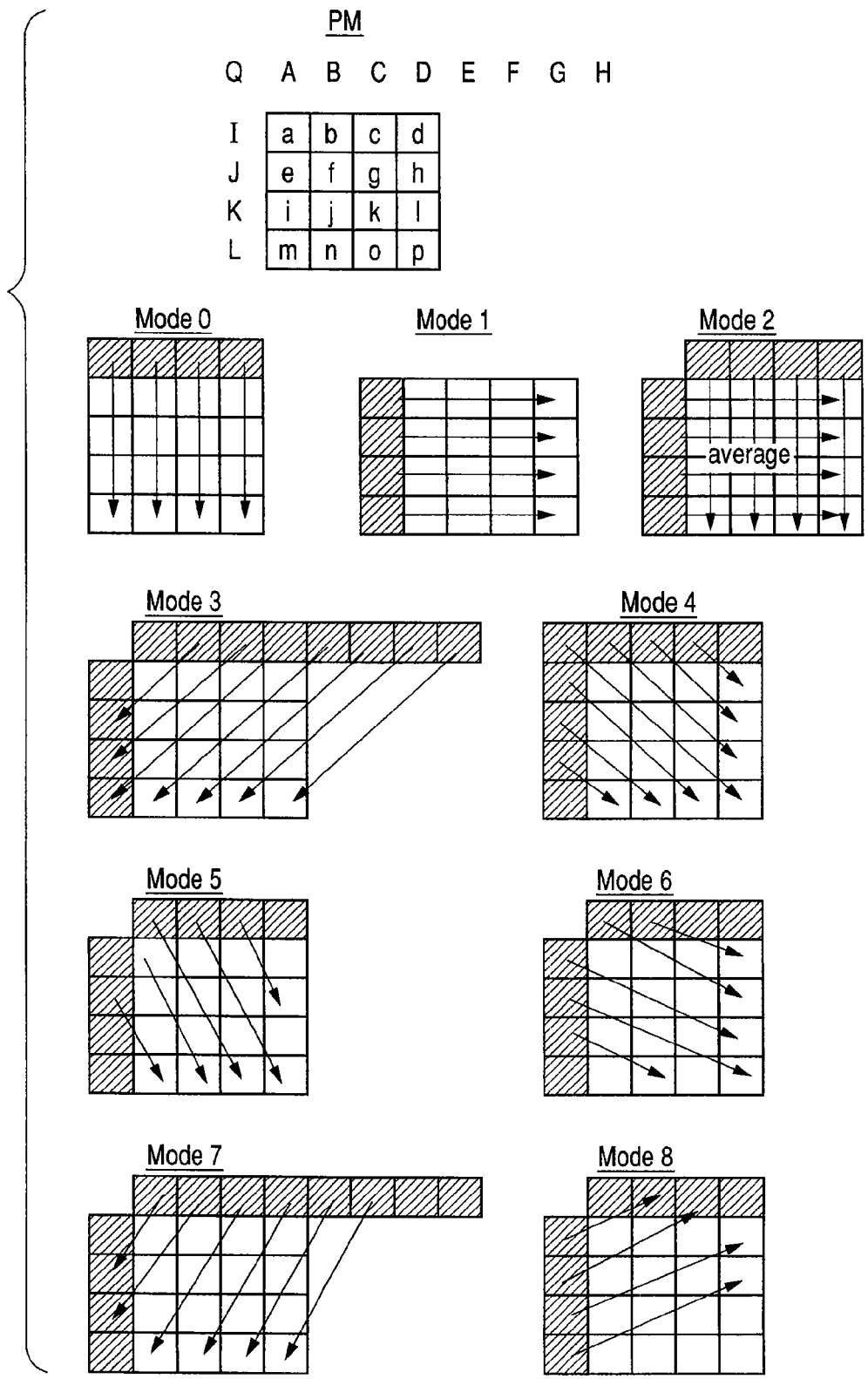
FIG. 3 is a diagram depicting the manner of a prediction mode PM in which one block of 4×4 samples is predicted spatially from samples adjacent thereto in accordance with the intra-frame prediction based on H.264/AVC.

The first moving picture processing unit Codec_EL_0 (2_0) and the second moving picture processing unit Codec_EL_1 (2_1) of the functional block FB of FIG. 1 are configured so as to perform intra-frame prediction based on H.264/AVC including 9 modes 0 through 8 shown in FIG. 3 by way of example. Thus, upon intra-frame prediction for processing of one macroblock MB707 of the second plural macroblocks MB100 . . . MB300 . . . MB500 . . . MB700 . . . MB706, MB707, MB708 . . . MB711 arranged in the odd-numbered rows by the second moving picture processing unit Codec_EL_1 (2_1) as shown in FIG. 2, data related to the results of processing of the plural adjacent macroblocks MB606, MB607 and MB608 of the first plural macroblocks MB000 . . . MB200 . . . MB400 . . . MB600 . . . MB606, MB607, MB608 . . . MB611 arranged in the even-numbered rows, which are located near the above one macroblock MB707, by the first moving picture processing unit Codec_EL_0 (2_0) are used.

The functional block FB shown in FIG. 1 includes a memory unit LM (6) coupled to the first moving picture processing unit Codec_EL_0 (2_0) and the second moving picture processing unit Codec_EL_1 (2_1) through data paths 9_0, 9_1 and 9_2. The memory unit LM (6) is configured as a line memory and constituted of an input/output interface (I/O Int) 10_60, a line memory controller LMC (11) and a static random access memory SRAM (12). Data related to the results of processing of the first plural macroblocks MB000 . . . MB200 . . . MB400 . . . MB600 . . . MB606, MB607, MB608 . . . MB611 arranged in the even-numbered rows of one picture, by the first moving picture processing unit Codec_EL_0 (2_0) are stored in the memory unit LM (6). Next, the data related to the results of processing of the macroblocks of the even-numbered row, which are stored in the memory unit LM (6), i.e., the data related to the results of processing of the plural adjacent macroblocks MB606, MB607 and MB608 corresponding to the sixth row are transferred from the memory unit LM (6) to the second moving picture processing unit Codec_EL_1 (2_1) at intra-frame prediction of the next odd-numbered row. In doing so, the second moving picture processing unit Codec_EL_1 (2_1) performs intra-frame prediction for the processing of one macroblock MB707 of the second plural macroblocks MB700 . . . MB706, MB707, MB708 . . . MB711 arranged in the seventh row corresponding to the odd-numbered row, using one transferred adjacent macroblock data corresponding to the sixth row. Likewise, the second moving picture processing unit Codec_EL_1 (2_1) performs processing of the second plural or twelve macroblocks MB700 . . . MB706, MB707, MB708 . . . MB711 arranged in the seventh row. Data related to the results of processing thereby are stored in the memory unit LM (6). Of the data related to the results of processing of the macroblocks corresponding to the odd-numbered row or seventh row stored in the memory unit LM (6), the data related to the result of processing of one adjacent macroblock of the plural adjacent macroblocks MB706, MB707 and MB708 corresponding to the seventh row is next transferred from the memory unit LM (6) to the first moving picture processing unit Codec_EL_0 (2_0) at intra-frame prediction of the next eighth row corresponding to the even-numbered row. In doing so, the first moving picture processing unit Codec_EL_0 (2_0) performs intra-frame prediction for the processing of one macroblock MB807 of the first plural macroblocks MB800 . . . MB806, MB807, MB808 . . . MB811 arranged in the eighth row corresponding to the even-numbered row, using one transferred adjacent macroblock data corresponding to the seventh row. Likewise, the second moving picture processing unit Codec_EL_1 (2_1) performs processing of the second plural or twelve macroblocks MB800 . . . MB806, MB807, MB808 . . . MB811 arranged in the eighth row. Data related to the results of processing thereby are stored in the memory unit LM (6).

Of the data related to the result of processing of the first plural macro blocks MB000 . . . MB200 . . . MB400 . . . MB600 . . . MB606, MB607, MB608 . . . MB611 arranged in the even-numbered rows of one picture, which are stored in the memory unit LM (6), by the first moving picture processing unit Codec_EL_0 (2_0), particularly, the data related to the results of processing of the plural adjacent macroblocks MB606, MB607 and MB608 arranged within the immediately preceding even-numbered row in the neighborhood of one macroblock MB707 of the second plural macroblocks MB700 . . . MB706, MB707, MB708 . . . MB711 arranged in at least an immediately-subsequent odd-numbered row, by the first moving picture processing unit Codec_EL_0 (2_0) are transferred from the memory unit LM (6) to the second moving picture processing unit Codec_EL_1 (2_1) prior to the processing start of intra-frame prediction for the processing of one macroblock MB707 of the second plural macroblocks MB700 . . . MB706, MB707, MB708 . . . MB711 by the second moving picture processing unit Codec_EL_1 (2_1).

Thus, prior to the processing start of the intra-frame prediction for the processing of one macroblock MB707 of the second plural macroblocks MB700 . . . MB706, MB707, MB708 . . . MB711 by the second moving picture processing unit Codec_EL_1 (2_1), the data related to the results of processing of the plural adjacent macroblocks MB606, MB607 and MB608 located in the neighborhood of at least one macroblock MB707 by the first moving picture processing unit Codec_EL_0 (2_0) have already been transferred from the memory unit LM (6) to the second moving picture processing unit Codec_EL_1 (2_1). Further, the result of processing of one macroblock (e.g., MB607) of the plural adjacent macroblocks MB606, MB607 and MB608 is selected out of the data related to the results of processing of the plural adjacent macroblocks MB606, MB607 and MB608 by the first moving picture processing unit Codec_EL_0 (2_0), which have been transferred from the memory unit LM (6), in accordance with a prediction mode (e.g., mode 0 in FIG. 3) used upon the intra-frame prediction of one macroblock MB707 prior to the processing start of the intra-frame prediction for the processing of one macroblock MB707 of the second plural macroblocks MB700 . . . MB706, MB707, MB708 . . . MB711 by the second moving picture processing unit Codec_EL_1 (2_1). The second moving picture processing unit Codec_EL_1 (2_1) executes the processing of one macroblock (e.g., MB707) of the second plural macroblocks MB700 . . . MB706, MB707, MB708 . . . MB711, using the selected result of processing. Thus, since the data related to the result of processing of one adjacent macroblock is selected in accordance with the prediction mode upon adaptation to the prediction mode used in the intra-frame prediction constituting a video coding layer of H.264/AVC, parallel processing by the plurality of moving picture parallel processing units can be facilitated.

As shown in FIG. 1, the first moving picture processing unit Codec_EL_0 (2_0) and the second moving picture processing unit Codec_EL_1 (2_1) respectively include memories 3_0_Reg, 3_1_Reg, 4_0_Reg, 4_1_Reg, 5_0_Reg and 5_1_Reg that store the data related to the results of processing of the macroblocks MB606 and MB706. The first moving picture processing unit Codec_EL_0 (2_0) and the second moving picture processing unit Codec_EL_1 (2_1) respectively make use of the data related to the results of processing of the macroblocks MB606 and MB706, which are stored in the memories 3_0_Reg, 3_1_Reg, 4_0_Reg, 4_1_Reg, 5_0_Reg and 5_1_Reg upon the intra-frame prediction for the processing of the succeeding macroblocks MB607 and MB707 immediately following the macroblocks MB606 and MB706. Thus, if the prediction mode used in the intra-frame prediction corresponds to the mode 1 (horizontal prediction) of FIG. 3, then the data related to the results of processing of the macroblocks MB606 and MB706, which are stored in the memories 3_0_Reg, 3_1_Reg, 4_0_Reg, 4_1_Reg, 5_0_Reg and 5_1_Reg can be used for intra-frame prediction at the processing of the succeeding macroblocks MB607 and MB707. Incidentally, each of these memories 3_0_Reg, 3_1_Reg, 4_0_Reg, 4_1_Reg, 5_0_Reg and 5_1_Reg can comprise a register, a flip-flop, an SRAM or the like which stores a plurality of bits therein. As shown in FIG. 1, the memories 3_0_Reg, 3_1_Reg, 4_0_Reg, 4_1_Reg, 5_0_Reg and 5_1_Reg are respectively constituted by two planes. While one of the two planes is supplying data to the other moving picture processing unit, the other plane is capable of storing data related to the result of processing by its own moving picture processing unit.

Further, as shown in FIG. 1, the first moving picture processing unit Codec_EL_0 (2_0) and the second moving picture processing unit Codec_EL_1 (2_1) are respectively configured by pipeline connections of a plurality of functional subunits 3_0, 4_0 and 5_0; 3_1, 4_1 and 5_1 operated with timings different from one another in function and different therefrom in pipeline operation so as to execute selected one processing of video coding and video decoding.

Each of the first functional subunits 3_0 and 3_1 is variable length coding VLC which executes a context-base adaptive variable length coding process of H.264 and a context-base adaptive variable length decoding process contrary to it. The first functional subunits 3_0 and 3_1 each corresponding to the variable length coding VLC execute decoding or coding processing of macroblock parameters, moving vector information, frequency transformation information and executes the latter decoding processing in FIG. 1.

Each of the second functional subunits 4_0 and 4_1 is a frequency converter or transformer TRF that executes processing of quantization of H.264 and frequency transformation of DCT (Discrete Cosine Transformation), and processing of dequantization thereof corresponding to its reverse, inverse DCT and inverse frequency transformation. In FIG. 1, the second functional subunits 4_0 and 4_1 respectively execute the processing of the latter dequantization, inverse DCT and inverse frequency transformation, and processing for frequency coefficient prediction.

Each of the third functional subunits 5_0 and 5_1 is a motion processor or compensator MC which executes a motion predicting process of H.264 and a motion compensating process contrary to it, and executes the latter motion compensating process and a deblocking filter process in FIG. 1.

Pipelines for the plural functional subunits 3_0, 4_0 and 5_0; 3_1, 4_1 and 5_1 of the first moving picture processing unit Codec_EL_0 (2_0) and the second moving picture processing unit Codec_EL_1 (2_1) are controlled by a macroblock pipeline controller MBLCnt (1_1) of the controller CNT through the control signal line 13.

Figure 4:
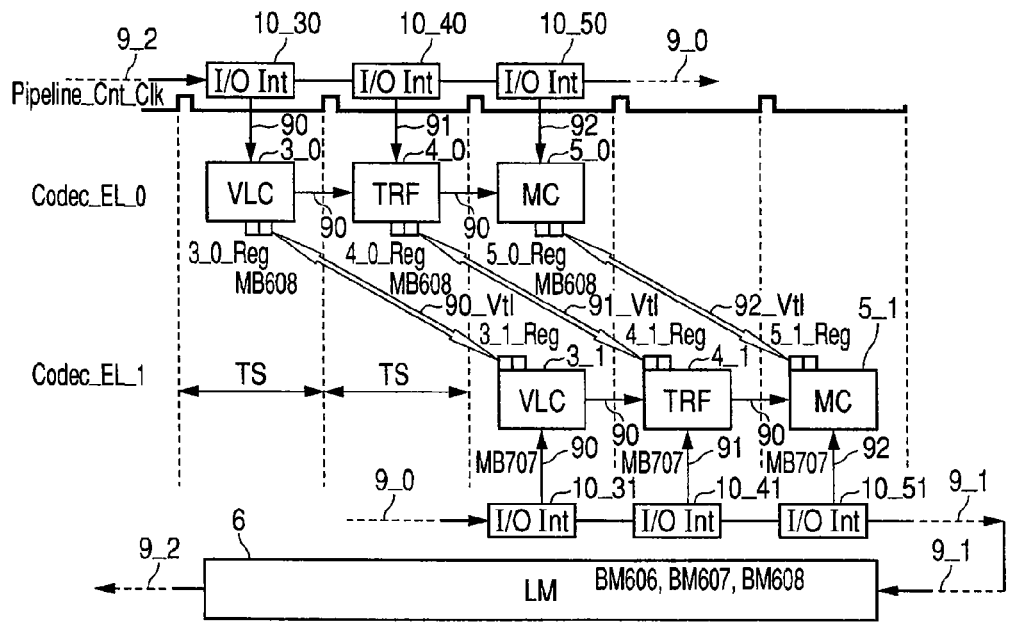
FIG. 4 is a diagram for describing pipeline operations for a plurality of functional subunits of a first moving picture processing unit and a second moving picture processing unit in the functional block shown in FIG. 1.

FIG. 4 is a diagram for describing the pipeline operations of the plural functional subunits 3_0, 4_0 and 5_0; 3_1, 4_1 and 5_1 of the first moving picture processing unit Codec_EL_0 (2_0) and the second moving picture processing unit Codec_EL_1 (2_1) in the functional block FB shown in FIG. 1.

As shown in FIG. 4, the timing provided to start the pipeline operation of the second moving picture processing unit Codec_EL_1 (2_1) is delayed by two time slots 2TS of the pipeline operation from the timing provided to start the pipeline operation of the first moving picture processing unit Codec_EL_0 (2_0). This delay can also be set to three time slots 3TS or more.

As shown in FIG. 4, the processing of one macroblock MB608 of the first plural macroblocks MB600 . . . MB606, MB607, MB608 . . . MB611 arranged in the sixth row by the functional subunit (VLC) 3_0 of the first moving picture processing unit Codec_EL_0 (2_0) is executed in the first time slot TS of the pipeline operation. Data 90 (macroblock parameter 90) related to the result of processing is stored in the memory 3_0_Reg of the functional subunit (VLC) 3_0 and the memory unit LM (6). The macroblock parameter 90 is data arranged in the final row of the blocks used for motion compensation prediction of inter picture prediction to be described in detail later using FIG. 8. During the first time slot TS, the data 90 can be stored from the functional subunit (VLC) 3_0 of the first moving picture processing unit Codec_EL_0 (2_0) to the memory unit LM (6) via three cascade-connected input/output interfaces (I/O Int) 10_30, 10_40 and 10_50 of the first moving picture processing unit Codec_EL_0 (2_0) and the data path 9_0, and three cascade-connected input/output interfaces (I/O Int) 10_31, 10_41 and 10_51 of the second moving picture processing unit Codec_EL_1 (2_1) and the data path 9_1.

Figure 5:
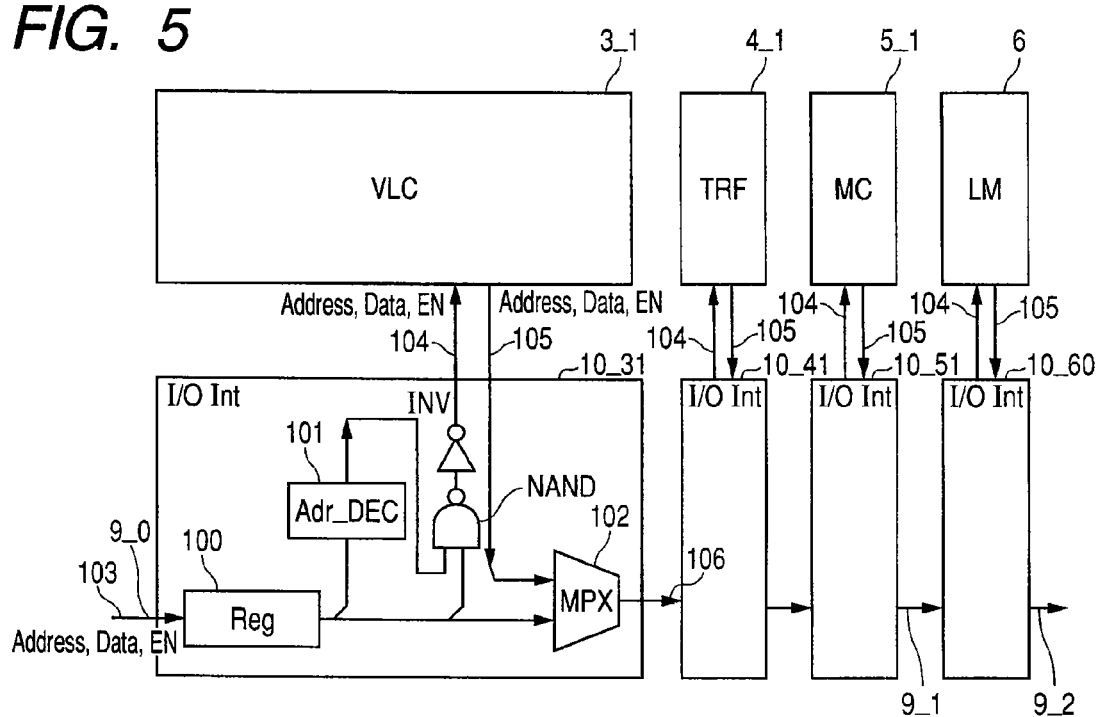
FIG. 5 is a diagram showing a configuration of the first and second moving picture processing units associated with three input/output interfaces connected in tandem.
Figure 6:
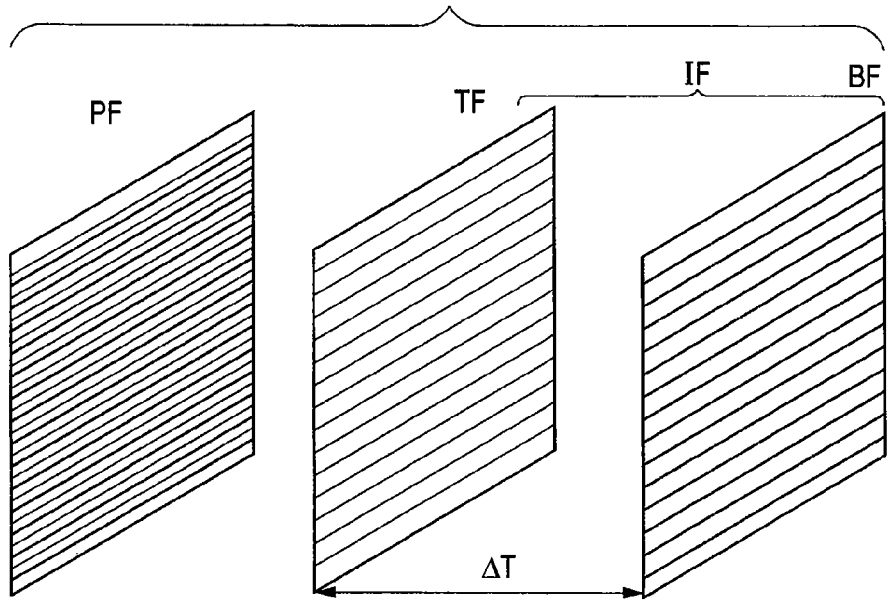
FIG. 6 is a diagram showing a macroblock adaptive frame/field-coded frame picture and field picture which have been defined in a VCL coding video sequence of H.264/AVC.

FIG. 5 is a diagram showing configurations of the cascade-connected three input/output interfaces (I/O Int) 10_30, 10_40, 10_50; 10_31, 10_41 and 10_51 of the first moving picture processing unit Codec_EL_0 (2_0) and the second moving picture processing unit Codec_EL_1 (2_1). In the input/output interface (I/O Int) 10_31, for example, an address signal, a data signal and an enable signal supplied from an input signal line 103 coupled to the data path 9_0 are supplied to a register 100. The input/output interfaces (I/O Int) 10_30, 10_40, 10_50, 10_31, 10_41 and 10_51 are respectively marked with unique device numbers. Thus, when an address decoder 101 of the input/output interface (I/O Int) 10_31 is supplied with the address signal corresponding to the unique device number, the address signal, data signal and enable signal on an output signal line 104 are supplied to the functional subunit (VLC) 3_1 of the second moving picture processing unit Codec_EL_1 (2_1) in response to the output of the address decoder 101. If the address signal does not correspond to the unique device number, then the address signal, data signal and enable signal are supplied to their corresponding input signal line 103 of the next-stage input/output interface (I/O Int) 10_41 through a multiplexer 102 and an output signal line 106. Further, an address signal, a data signal and an enable signal generated from the functional subunit (VLC) 3_1 of the second moving picture processing unit Codec_EL_1 (2_1) can also be supplied to their corresponding input signal line 103 of the next-stage input/output interface (I/O Int) 10_41 through the multiplexer 102 and the output signal line 106.

As shown in FIG. 4, the data 90 related to the above-described result of processing is read from the memory unit LM (6) in a second time slot TS of the pipeline operation. Further, the read data 90 related to the result of processing can be transferred to the functional subunit (VLC) 3_1 of the second moving picture processing unit Codec_EL_1 (2_1) through the data path 9_2, the cascade-connected three input/output interfaces (I/O Int) 10_30, 10_40 and 10_50 of the first moving picture processing unit Codec_EL_0 (2_0), the data path 9_0 and one input/output interface (I/O Int) 10_31 of the second moving picture processing unit Codec_EL_1 (2_1).

As a result, upon intra-frame prediction for the processing of one macroblock MB707 of the second plural macroblocks MB700 . . . MB706, MB707, MB708 . . . MB711 arranged in the seventh row, by the functional subunit (VLC) 3_1 of the second moving picture processing unit Codec_EL_1 (2_1) in a third time slot TS of the pipeline operation, the data 90 (macroblock parameter 90) related to the result of processing of one adjacent macroblock MB608 selected from the plural adjacent macroblocks MB606, MB607 and MB608 arranged in the sixth row, which are located in the neighborhood of such one macroblock MB707 arranged in the seventh row, by the functional subunit (VLC) 3_0 of the first moving picture processing unit Codec_EL_0 (2_0) can be used.

During the three time slots 3TS of the pipeline operation described above, the execution of processing of one macroblock MB608 of the first plural macroblocks arranged in the sixth row by the functional subunit (VLC) 3_0 of the first moving picture processing unit Codec_EL_0 (2_0), the storage of the data 90 related to the result of processing thereby into the memory unit LM (6), the reading of the data 90 related to the above result of processing from the memory unit LM (6), the transfer of the same to the functional subunit (VLC) 3_1 of the second moving picture processing unit Codec_EL_1 (2_1), and the intra-frame prediction for the processing of one macroblock MB707 of the second plural macroblocks arranged in the seventh row by the functional subunit (VLC) 3_1 of the second moving picture processing unit Codec_EL_1 (2_1) having used the transferred data 90 can be carried out using a ring data path constituted of the plural input/output interfaces 10_30, 10_40 and 10_50; 10_31, 10_41 and 10_51 of the first moving picture processing unit Codec_EL_0 (2_0) and the second moving picture processing unit Codec_EL_1 (2_1), the memory unit LM (6) and the data paths 9_0, 9_1 and 9_2.

Thus, while the above-described ring data path has a long signal transfer path in fact but can be assumed to provide a virtual high-speed signal transmission line 90_Vt1 shown in FIGS. 1 and 4, for transferring the data 90 related to one result of processing to the other bidirectionally between the functional subunit (VLC) 3_0 of the first moving picture processing unit Codec_EL_0 (2_0) and the functional subunit (VLC) 3_1 of the second moving picture processing unit Codec_EL_1 (2_1).

Further, as shown in FIG. 4, the functional subunit (TRF) 4_0 of a second-stage pipeline in the first moving picture processing unit Codec_EL_0 (2_0) executes processing of dequantization of the corresponding macroblock MB608 arranged in the sixth row, inverse DCT thereof and inverse frequency transformation thereof, and processing for frequency coefficient prediction, using the data 90 and frequency transformation information related to the result of processing of the macroblock MB608, which are produced by the functional subunit (VLC) 3_0 of the first-stage pipeline of the first moving picture processing unit Codec_EL_0 (2_0). From the result of processing obtained by the above processing, the functional subunit (TRF) 4_0 of the second-stage pipeline in the first moving picture processing unit Codec_EL_0 (2_0) transfers intra predicting pixel data 91 to the functional subunit (TRF) 4_1 of the second-stage pipeline for processing the macroblock MB707 arranged in the seventh row at the second moving picture processing unit Codec_EL_0 (2_1). The intra predicting pixel data 91 is also data arranged in the final row of the blocks used for motion compensation prediction of inter picture prediction to be described in detail later using FIG. 8. The transfer of the intra predicting pixel data 91 from the functional subunit (TRF) 4_0 of the second-stage pipeline in the first moving picture processing unit Codec_EL_0 (2_0) to the functional subunit (TRF) 4_1 of the second-stage pipeline in the second moving picture processing unit Codec_EL_1 (2_1) is carried out via the above-described ring data path constituted of the plural input/output interfaces 10_30, 10_40 and 10_50; 10_31, 10_41 and 10_51 of the first moving picture processing unit Codec_EL_0 (2_0) and the second moving picture processing unit Codec_EL_1 (2_1), the memory unit LM (6) and the data paths 9_0, 9_1 and 9_2. Thus, the above-described ring data path can be assumed to provide a virtual high-speed signal transmission line 91_Vt1 shown in FIGS. 1 and 4, for transferring the intra predicting pixel data 91 related to one result of processing to the other bidirectionally between the functional subunit (TRF) 4_0 of the second-stage pipeline in the first moving picture processing unit Codec_EL_0 (2_0) and the functional subunit (TRF) 4_1 of the second-stage pipeline in the second moving picture processing unit Codec_EL_1 (2_1). The execution of processing of one macroblock MB608 of the first plural macroblocks arranged in the sixth row by the functional subunit (TRF) 4_0 of the second-stage pipeline in the first moving picture processing unit Codec_EL_0 (2_0), the storage of the intra predicting pixel data 91 related to the result of processing thereby into the memory unit LM (6), the reading of the intra predicting pixel data 91 related to the above result of processing from the memory unit LM (6), the transfer of the same to the functional subunit (VLC) 3_1 of the second moving picture processing unit Codec_EL_1 (2_1), and the intra-frame prediction for the processing of one macroblock MB707 of the second plural macroblocks arranged in the seventh row by the functional subunit (TRF) 4_1 of the second-stage pipeline in the second moving picture processing unit Codec_EL_1 (2_1) having used the transferred intra predicting pixel data 91 can be carried out using such a ring data path.

The functional subunit (TRF) 4_0 of the second-stage pipeline in the first moving picture processing unit Codec_EL_0 (2_0) transfers the data 90 related to the result of processing of the macroblock MB608 arranged in the sixth row, which has been produced by the functional subunit (VLC) 3_0 of the first-stage pipeline, to the motion compensator corresponding to the functional subunit (MC) 5_0 of the third-stage pipeline.

In conjunction with this motion processing, a video coding layer VCL of H.264/AVC also has a function of motion compensation prediction MCP for performing inter picture prediction (inter frame prediction) corresponding to prediction between a plurality of pictures.

Figure 8:
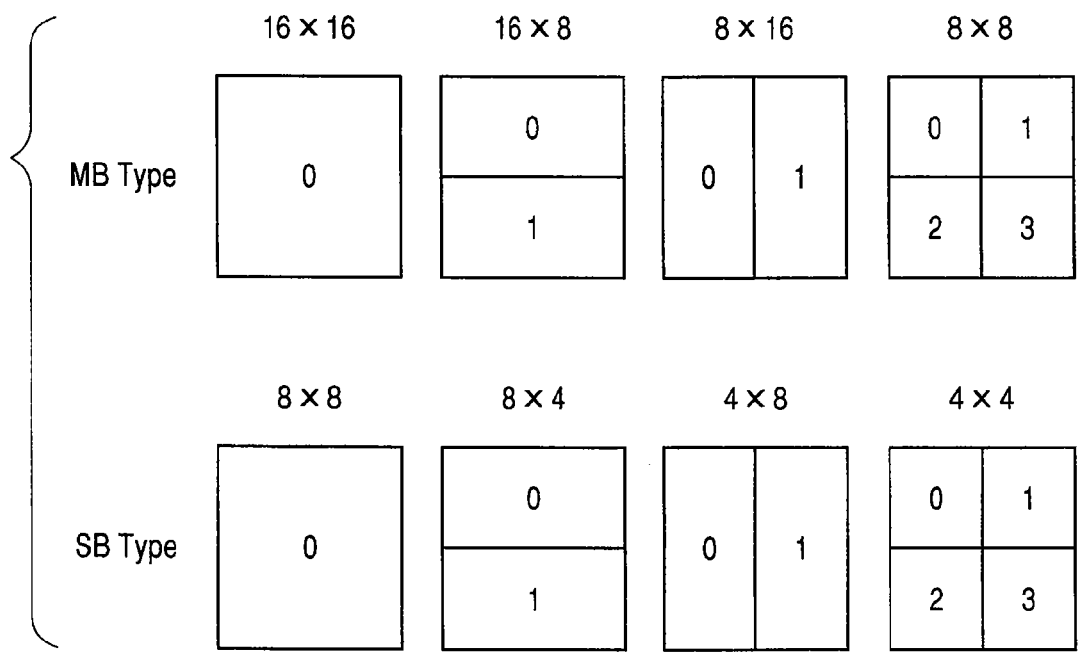
FIG. 8 is a diagram showing the manner in which one macroblock is divided into smaller areas for the purpose of motion compensation prediction MCP of H.264/AVC.

FIG. 8 is a diagram showing the manner in which one macroblock is divided into smaller areas for motion compensation prediction MCP of H.264/AVC. An upper stage of FIG. 8 indicates segmentation of block sizes of samples of 16×16, 16×8, 8×16 and 8×8 with luminance. A lower stage of FIG. 8 indicates segmentation of block sizes of samples of 8×8, 8×4, 4×8 and 4×4 with luminance. The blocks for motion compensation prediction of the upper and lower stages of FIG. 8 include syntaxes for motion compensation prediction. Using the syntaxes enabling such multi-picture motion compensation prediction that one or more previously-coded pictures are used in the reference for motion compensation prediction. Upon the parallel processing of the plurality of macroblocks according to the embodiment of the present invention, data arranged in the final row of any block is transferred between the plurality of processing units.

Figure 9:
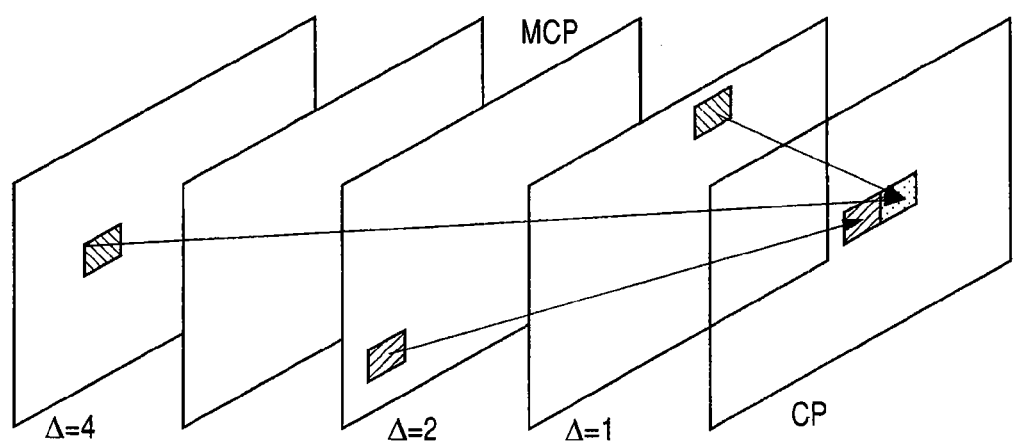
FIG. 9 is a diagram illustrating multi-picture motion compensation prediction of H.264/AVC.

FIG. 9 is a diagram showing multi-picture motion compensation prediction of H.264/AVC. The present picture CP can be predicted by transferring moving vectors and picture reference parameters Δ (=1, 2 and 4) from the previously-coded pictures.

As shown in FIG. 4, the motion compensator corresponding to the functional subunit (MC) 5_0 of the third-stage pipeline of the first moving picture processing unit Codec_EL_0 (2_0) performs such multi-picture motion compensation prediction of H.264/AVC as shown in FIG. 9 on the macroblock MB608 arranged in the sixth row, using the data 90 related to the result of processing of the macroblock MB608 arranged in the sixth row, which is transferred from the functional subunit (TRF) 4_0 of the second-stage pipeline and generated at the functional subunit (VLC) 3_0 of the first-stage pipeline. As a result, the motion compensator corresponding to the functional subunit (MC) 5_0 of the third-stage pipeline in the first moving picture processing unit Codec_EL_0 (2_0) transfers pixel data 92 of 4 to 8 lines arranged in the final row of the blocks used in the motion compensation prediction of the inter picture prediction described in FIG. 8, of the obtained result of processing to the motion compensator corresponding to the functional subunit (MC) 5_1 of the third-stage pipeline in the second moving picture processing unit Codec_EL_1 (2_1). The transfer of the pixel data 92 of the 4 to 8 lines arranged in the final row of the blocks used in the motion compensation prediction of the inter picture prediction from the motion compensator corresponding to the functional subunit (MC) 5_0 of the third-stage pipeline in the first moving picture processing unit Codec_EL_0 (2_0) to the motion compensator corresponding to the functional subunit (MC) 5_1 of the third-stage pipeline in the second moving picture processing unit Codec_EL_1 (2_1) is executed via the above ring data path constituted of the plural input/output interfaces 10_30, 10_40 and 10_50; 10_31, 10_41 and 10_51 of the first moving picture processing unit Codec_EL_0 (2_0) and the second moving picture processing unit Codec_EL_1 (2_1), the memory unit LM and the data paths 9_0, 9_1 and 9_2. Thus, the above-described ring data path can be assumed to provide a virtual high-speed signal transmission line 92_Vt1 shown in FIGS. 1 and 4, for transferring th pixel data 92 of one motion compensator to the other bidirectionally between the motion compensator corresponding to the functional subunit (MC) 5_0 of the third-stage pipeline in the first moving picture processing unit Codec_EL_0 (2_0) and the motion compensator corresponding to the functional subunit (MC) 5_1 of the third-stage pipeline in the second moving picture processing unit Codec_EL_1 (2_1). The execution of processing of one macroblock MB608 of the first plural macroblocks arranged in the sixth row by the motion compensator corresponding to the functional subunit (MC) 5_1 of the third-stage pipeline in the first moving picture processing unit Codec_EL_0 (2_0), the storage of the pixel data 92 related to the result of processing thereby into the memory unit LM (6), the reading of the pixel data 92 related to the above result of processing from the memory unit LM (6), the transfer of the same to the functional subunit (MC) 5_1 of the third-stage pipeline, and the intra-frame prediction for the processing of one macroblock MB707 of the second plural macroblocks arranged in the seventh row by the functional subunit (MC) 5_1 of the third-stage pipeline having used the transferred pixel data 92 can be carried out using such a ring data path.

With the above operations, the two rows including the plural macroblocks of one picture can be parallel-processed simultaneously. That is, as compared with a single operation at the same operating frequency, the two parallel processes are equivalent to having double processing performance. As compared with the case in which the double processing performance is reached under the single operation, the operating frequency can be set to ½. This is suitable for a battery operation of a mobile device. Sine the memory unit LM (6) of the line memory is shared between the first moving picture processing unit Codec_EL_0 (2_0) and the second moving picture processing unit Codec_EL_1 (2_1), the memory capacity per processing performance is brought to ½. The parallel pipeline operation at the time difference 2TS shown in FIG. 4 can be adapted to both top and bottom fields of a field picture corresponding to the coding video sequence of the video coding layer of H.264/AVC.

<<Adaptation to Field Picture>>

Figure 13:
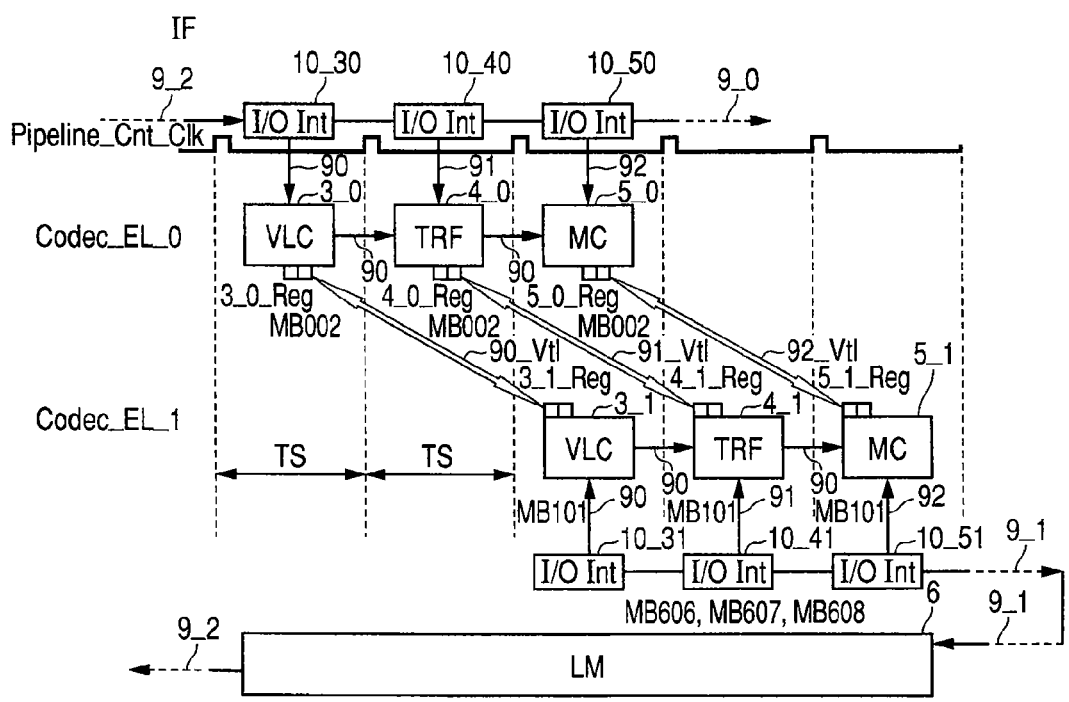
FIG. 13 is a diagram for describing parallel pipeline operations of a functional block FB capable of adapting to both of top and bottom fields of a field picture based on H.264/AVC.

FIG. 13 is a diagram for describing parallel pipeline operations of a functional block FB capable of corresponding to both of top and bottom fields of a field picture of H.264/AVC.

Even in the case of the parallel pipeline operations shown in FIG. 13, the time difference becomes 2TS. Thus, the processing of one macroblock MB002 of the first plural macroblocks MB000, MB001, MB002 . . . MB006, MB007, MB008 . . . MB011 arranged in the 0thh row by the first moving picture processing unit Codec_EL_0 (2_0) is executed in a first time slot TS of the pipeline operation even in any time zone or slot of both the top and bottom fields of the field picture. Data related to the result of processing is stored in the corresponding memory unit LM (6). During a second time slot TS of the pipeline operation, the data related to the result of processing can be transferred from the memory unit LM (6) to the second moving picture processing unit Codec_EL_1 (2_1). As a result, upon intra-frame prediction for the processing of one macroblock MB101 of the second plural macroblocks MB100, MB101, MB102 . . . MB106, MB107, MB108 . . . MB111 arranged in the first row, by the second moving picture processing unit Codec_EL_1 (2_1) in a third time slot TS of the pipeline operation, data related to the result of processing of one adjacent macroblock MB002 selected from the plural adjacent macroblocks MB000, MB001 and MB002 located in the neighborhood of one macroblock MB101, by the first moving picture processing unit Codec_EL_0 (2_0) can be used. Thus, the parallel pipeline operations can be adapted to both the top and bottom fields of the field picture corresponding to the coding video sequence of the video coding layer of H.264/AVC.

<<Adaptation to Macroblock Adaptive Frame/Field-Coded Frame Picture>>

Figures 10, 11:
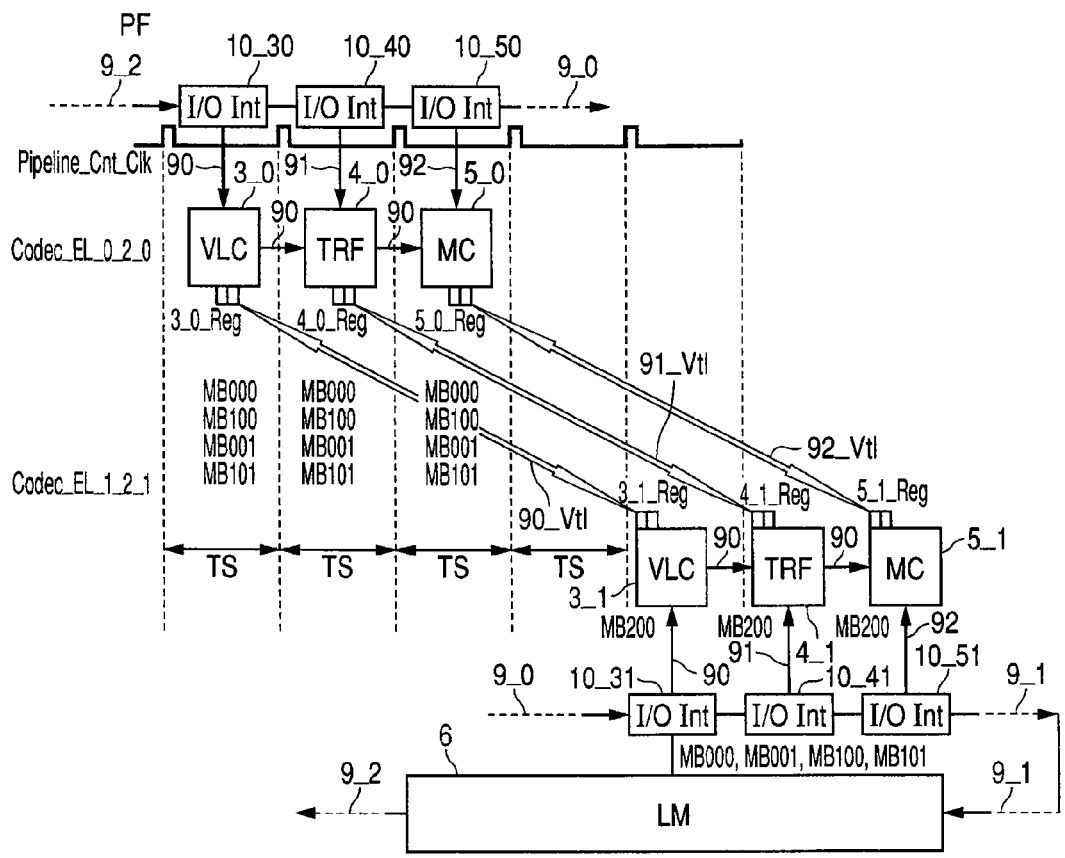
FIG. 10 is a diagram showing a functional block corresponding to a macroblock adaptive frame/field-coded frame picture of H.264/AVC.
FIG. 11 is a diagram illustrating the manner in which a first moving picture processing unit and a second moving picture processing unit operated in parallel process a plurality of macroblocks in a time zone of a top field containing only rows of even numbers where a VCL coding video sequence of H.264/AVC is a filed picture.
Figure 12:
FIG. 12 is a diagram showing the manner in which a first moving picture processing unit and a second moving picture processing unit operated in parallel process a plurality of macroblocks in a time zone of a bottom field containing only rows of odd numbers where a VCL coding video sequence of H.264/AVC is a field picture.

FIG. 10 is a diagram showing a functional block FB corresponding to a macroblock adaptive frame/field-coded frame picture PM of H.264/AVC.

Figure 7:
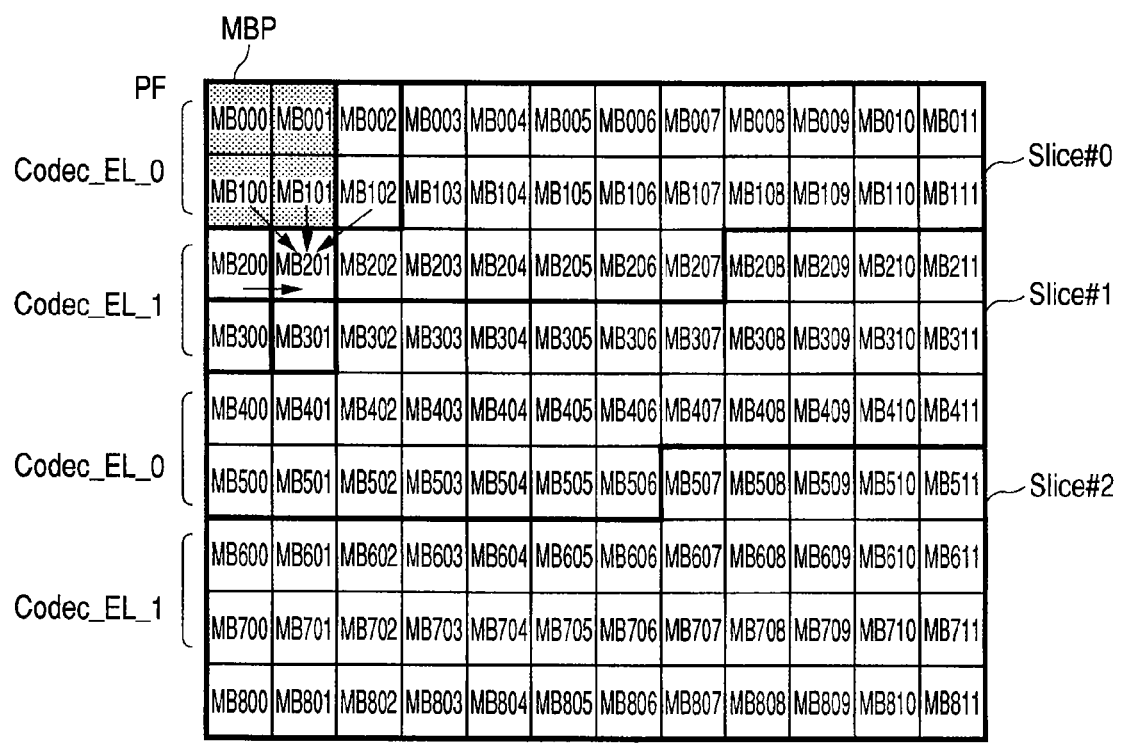
FIG. 7 is a diagram showing the manner in which a first moving picture processing unit and a second moving picture processing unit operated in parallel process a plurality of macroblocks where a coding video sequence of VCL of H.264/AVC is a macroblock adaptive frame/field-coded frame picture.

In the functional block FB, as shown in FIG. 7, the first moving picture processing unit Codec_EL_0 (2_0) processes sets of macroblock pairs MBP of the same rows in first plural macroblocks MB000 . . . MB006, MB007, MB008 . . . MB011 arranged in a 0th row of one picture and second plural macroblocks MB100 . . . MB106, MB107, MB108 . . . MB111 arranged in a first row located immediately after the 0th row as data units. On the other hand, the second moving picture processing unit Codec_EL_1 (2_1) processes sets of macroblock pairs MBP of the same rows in third plural macroblocks MB200 . . . MB206, MB207, MB208 . . . MB211 arranged in a second row located immediately after the first row, and fourth plural macroblocks MB300 . . . MB306, MB307, MB308 . . . MB311 arranged in a third row located immediately after the second row as data units.

In the functional block FB shown in FIG. 10, the first moving picture processing unit Codec_EL_0 (2_0) and the second moving picture processing unit Codec_EL_1 (2_1) are respectively constituted by pipeline connections of plural functional subunits (3_0, 4_0, 5_0; 3_1, 4_1, 5_1) operated with timings different from one another in function and different in pipeline operation so as to execute selected one processing of video coding and video decoding. The timing provided to start the pipeline operation of the second moving picture processing unit Codec_EL_1 (2_1) is delayed by four time slots (4TS) or more of the pipeline operation from the timing provided to start the pipeline operation of the first moving picture processing unit Codec_EL_0 (2_0).

Thus, the processing of one macroblock MB000 of the first plural macroblocks MB000 . . . MB006, MB007, MB008. MB011 arranged in the 0th row of one picture by the first moving picture processing unit Codec_EL_0 (2_0) is executed in the first time slot TS of the pipeline operation. The processing of one macroblock MB100 of the second plural macroblocks MB100 . . . MB106, MB107, MB108 . . . MB111 arranged in the first row by the first moving picture processing unit Codec_EL_0 (2_0) is executed in the second time slot TS of the pipeline operation. Consequently, the processing of one macroblock pair MBP constituted of the two macroblocks MB000 and MB100 is completed. The processing of one succeeding macroblock MB001 of the first plural macroblocks MB000 . . . MB006, MB007, MB008 . . . MB011 arranged in the 0th row by the first moving picture processing unit Codec_EL_0 (2_0) is executed in the third time slot TS of the pipeline operation. The processing of one succeeding macroblock MB101 of the second plural macroblocks MB100 . . . MB106, MB107, MB108 . . . MB111 arranged in the first row by the first moving picture processing unit Codec_EL_0 (2_0) is executed in the fourth time slot TS of the pipeline operation. Thus, the processing of one macroblock pair MBP constituted of the two macroblocks MB001 and MB101 is completed. Further, data related to these processes are stored in the memory unit LM. Upon intra-frame prediction for the processing of the macroblock pair MBP including one macroblock MB200 of the third plural macroblocks MB200 . . . MB206, MB207, MB208 . . . MB211 arranged in the second row located immediately after the first row in the fifth time slot TS of the pipeline operation, the second moving picture processing unit Codec_EL_1 (2_1) can make use of data related to the results of processing of the plural adjacent macroblock pairs MB000, MB100, MB001 and MB101 located near the macroblock pair MBP by the first moving picture processing unit Codec_EL_0 (2_0). As a result, the functional block FB can be adapted even to a macroblock adaptive frame/field-coded frame picture PM corresponding to a coding video sequence of a video decoding layer of H.264/AVC.

<<Coding Device>>

Figure 14:
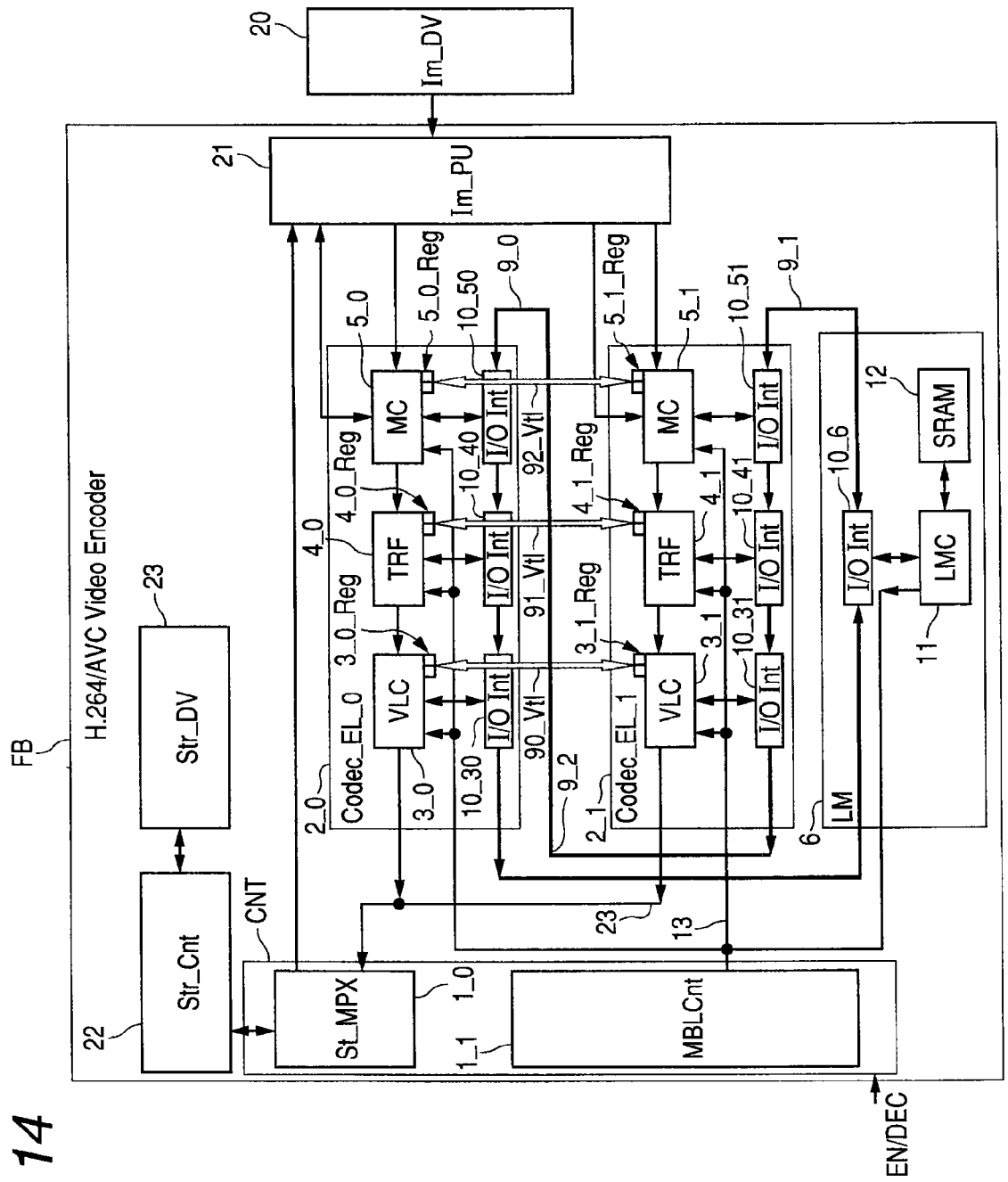
FIG. 14 is a diagram showing the manner in which a functional block according to one embodiment of the present invention is operated as a coding device.

FIG. 14 is a diagram showing the manner in which a functional block FB according to one embodiment of the present invention is operated as a coding device (encoder).

When an operation mode signal EN of a level or bit pattern for instructing a system initialization sequence to operate the functional block FB as the encoder is supplied, common hardware resources 3_0, 4_0, 5_0 and 3_1, 4_1 and 5_1 respectively constituting a first moving picture processing unit Codec_EL_0 (2_0) and a second moving picture processing unit Codec_EL_1 (2_1) are respectively operated as encoders.

Moving-picture or vide data from an imaging device 20 such as CCD is supplied to a moving picture or video signal processing unit 21 of the functional block FB, where it is separated, followed by being supplied to a motion processor or compensator MC of the third functional subunit 5_0 in the first moving picture processing unit Codec_EL_0 (2_0), and a motion processor or compensator MC of the third functional subunit 5_1 in the second moving picture processing unit Codec_EL_1 (2_1). An output of the motion compensator MC of the third functional subunit 5_0 and an output of the motion compensator MC of the third functional subunit 5_1 are respectively supplied to the input of a frequency transform TRF of the second functional subunit 4_0 in the first moving picture processing unit Codec_EL_0 (2_0) and the input of a frequency transform TRF of the second functional subunit 4_1 in the second moving picture processing unit Codec_EL_1 (2_1). An output of the frequency transform TRF of the second functional subunit 4_0 and an output of the frequency transform TRF of the second functional subunit 4_1 are respectively supplied to the input of variable length coding VLC of the first functional subunit 3_0 in the first moving picture processing unit Codec_EL_0 (2_0) and the input of variable length coding VLC of the first functional subunit 3_1 in the second moving picture processing unit Codec_EL_1 (2_1). H.264/AVC-based video coding data corresponding to an output of the variable length coding VLC of the first functional subunit 3_0 and an output of the variable length coding VLC of the first functional subunit 3_1 are stored in a storage device 23 such as HDD, an optical disk, a mass-storage non-volatile flash memory, a memory or the like through a stream multiplexer (St_MPX) 1_0 of a controller CNT and a storage controller 22.

<<Decoder Improved in Parallel Degree>>

Figure 15:
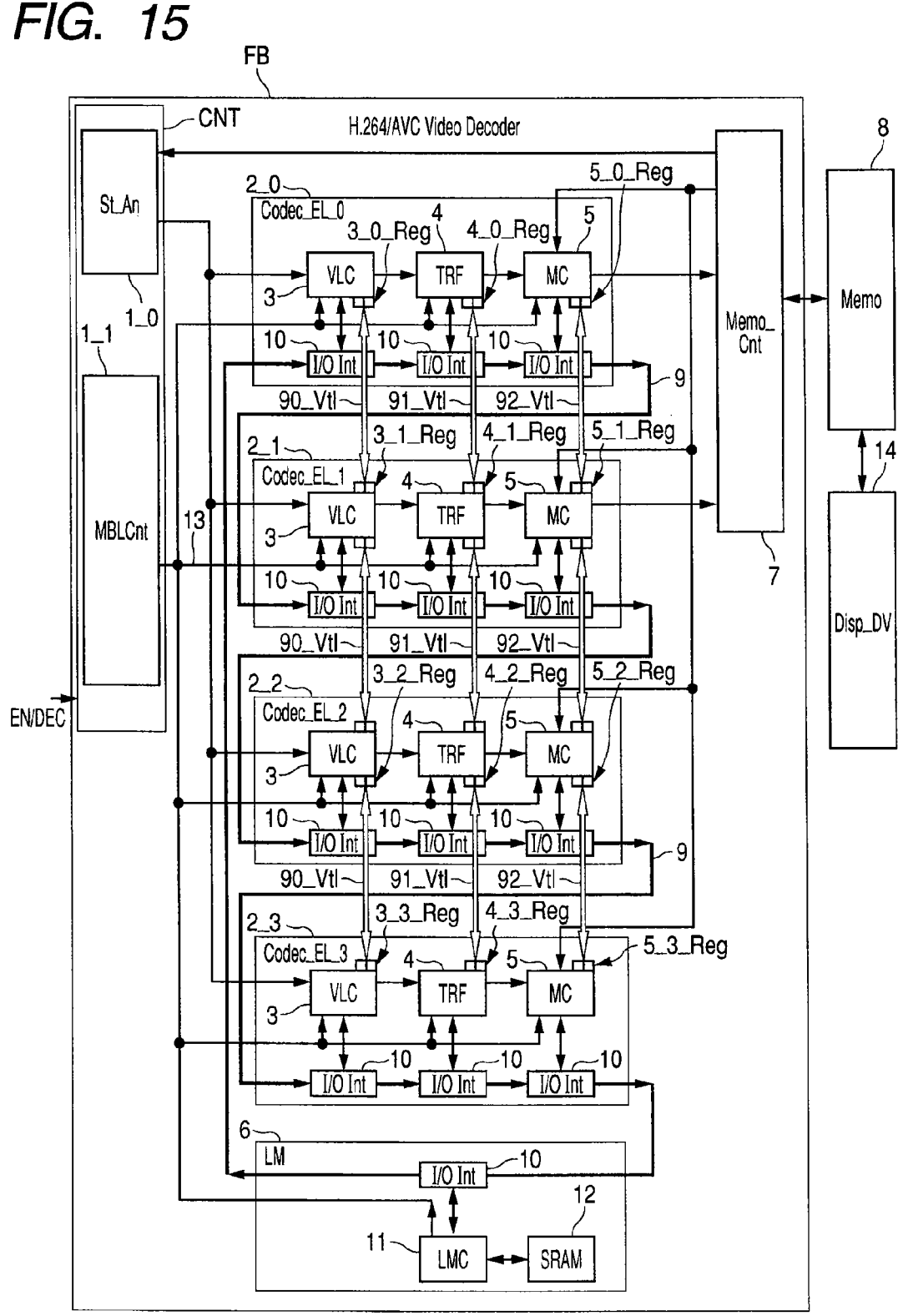
FIG. 15 is a diagram showing the manner in which a functional block improved in parallel degree according to another embodiment of the present invention is operated as a decoding device.

FIG. 15 is a diagram showing the manner in which a functional block FB improved in parallel degree according to another embodiment of the present invention is operated as a decoding device (decoder).

The functional block FB comprises four of a first moving picture processing unit Codec_EL_0 (2_0), a second moving picture processing unit Codec_EL_1 (2_1), a third moving picture processing unit Codec_EL_2 (2_2) and a fourth moving picture processing unit Codec_EL_3 (2_3) and is improved in parallel processing degree of plural macroblocks. It is needless to say that when an operation mode signal EN of a level or bit pattern for instructing a system initialization sequence to operate the functional block FB as a coding device is supplied, the functional block FB of FIG. 15 is operated as the coding device (encoder) in a manner similar to FIG. 14.

<<Specific Example of Functional Block FB>>

Figure 16:
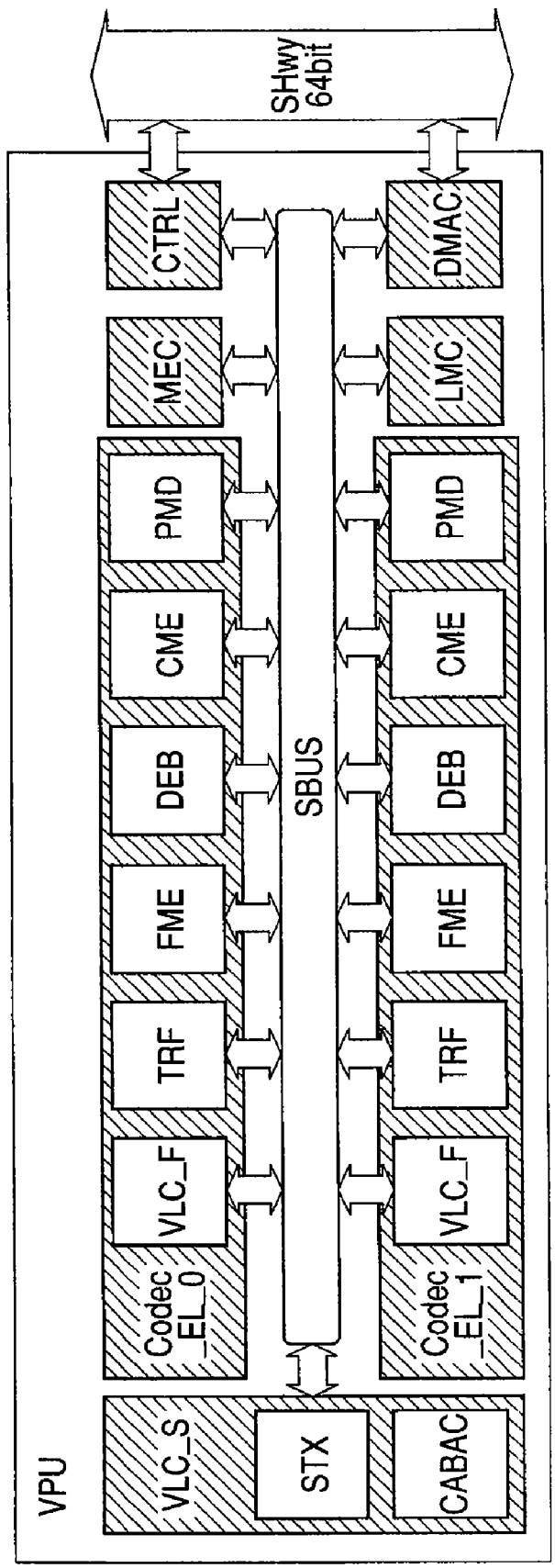
FIG. 16 is a diagram illustrating a specific example of the functional block according to the one embodiment of the present invention.

FIG. 16 is a diagram illustrating a specific example of the functional block FB according to the one embodiment of the present invention.

As shown in FIG. 16, a core VPU (Video Processing Unit) used as the functional block FB comprises a variable length coding decoder (stream synchronous processing) VLC_S (equivalent to the controller CNT shown in FIG. 1), a first moving picture processing unit Codec_EL_0 (2_0) and a second moving picture processing unit Codec_EL_1 (2_1) each including common hardware resources VLC_F, TRF, FME, DEB, CME and PMD, a motion detection/intra predicting memory controller MEC, a VPU overall controller CTRL, a line memory controller LMC (equivalent to the line memory controller LMC (11) shown in FIG. 1), and a direct memory access controller DMAC. The VPU overall controller CTRL and the direct memory access controller DMAC are coupled to a 64-bit super highway bus SHwy capable of transferring packet data.

In particular, the direct memory access controller DMAC is used for high-speed data transfer of a beam stream containing lots of macroblocks between an external SDRAM connected to the super highway bus SHwy and the first and second moving picture processing units Codec_EL_0 (2_0) and Codec_EL_1 (2_1).

The common hardware resources of the first moving picture processing unit Codec_EL_0 (2_0) and the second moving picture processing unit Codec_EL_1 (2_1) include the following functional subunits VLC_F, TRF, FME, DEB, CME and PMD.

VLC_F indicates a variable length coding decoder (macroblock synchronous processing), TRF indicates a frequency transformation/coefficient prediction unit, FME indicates a dense search motion detection/motion compensator, DEB indicates a deblocking filter/motion compensator, CME indicates a coarse search motion detector, and PMD indicates an intra prediction unit. The decoding or variable length coding decoder (stream synchronous processing) VLC_S includes a syntax analyzer STX and an H.264 arithmetic coding/decoding unit CABAC. All these subblocks are coupled to one another via a ring-type bus SBUS and capable of transferring all data containing data for intra-frame prediction and inter-frame prediction by having unique IDs respectively.

While the invention made above by the present inventors has been described specifically on the basis of the preferred embodiments, the present invention is not limited to the embodiments referred to above. It is needless to say that various changes can be made thereto without the scope not departing from the gist thereof.

For example, the internal configurations of the first moving picture processing unit Codec_EL_0 (2_0) and the second moving picture processing unit Codec_EL_1 (2_1) for processing the macroblocks can be provided even for a processor type and a hardwired dedicated circuit. That is, the functional subunits 3_0, 3_1, 4_0, 4_1, 5_0 and 5_1 shown in FIG. 1 can respectively be configured even with respect to a processor for soft processing and hardware processing based on a dedicated circuit.

Even other than a semiconductor integrated circuit for moving-picture or vide processing, the present invention can widely be adopted as an IP core which is mounted in an analog/digital-mixed type mixed signal system LSI and executes video coding and video decoding based on H.264.

What is claimed is:

1. A functional block capable of executing at least any one of video coding and video decoding based on H. 264/AVC, comprising:
at least a first moving picture processing unit and a second moving picture processing unit capable of parallel operations; and
a memory unit which is coupled to the first moving picture processing unit and the second moving picture processing unit and stores therein data related to results of processing by the first moving picture processing unit,
wherein, when the first moving picture processing unit and the second moving picture processing unit perform the parallel operations, a data processing unit processed by each of the first moving picture processing unit and the second moving picture processing unit includes macroblocks having a plurality of sample numbers,
wherein each of the first moving picture processing unit and the second moving picture processing unit includes pipeline connections of a plurality of functional subunits operated with timings different from one another in function and different in pipeline operation so as to execute a selected one of the video coding and the video decoding,
wherein the functional block is operative to processes a field picture and a coded frame picture, separately,
wherein, when the functional block processes a top field or a bottom field of the field picture, the first moving picture processing unit sequentially processes first plural macroblocks arranged within one row of one picture, and the second moving picture processing unit sequentially processes second plural macroblocks arranged within another row of the one picture, different from the one row, and the timing to start the pipeline operation of the second moving picture processing unit is delayed by two or more time slots of the pipeline operation from the timing to start the pipeline operation of the first moving picture processing unit, and data related to results of processing of plural adjacent macroblocks of the first plural macroblocks, which are located in a neighborhood of one macroblock of the second plural macroblocks, by the first moving picture processing unit, are used upon intra-frame prediction for processing of the one macroblock of the second plural macroblocks by the second moving picture processing unit,
wherein, when the functional block processes the coded frame picture, the first moving picture processing unit processes as data units respective sets of macroblock pairs of same rows in first plural macroblocks arranged within one row of one picture and second plural macroblocks arranged within a first succeeding row located immediately after the one row, and the second moving picture processing unit processes as data units respective sets of macroblock pairs of same rows in third plural macroblocks arranged within a second succeeding row located immediately after the first succeeding row, and fourth plural macroblocks arranged within a third succeeding row located immediately after the second succeeding row, and the timing to start the pipeline operation of the second moving picture processing unit is delayed by four or more time slots of the pipeline operation from the timing to start the pipeline operation of the first moving picture processing unit, and
wherein the data related to the results of processing of at least the plural adjacent macroblocks by the first moving picture processing unit are transferred from the memory unit to the second moving picture processing unit prior to the start of processing for the intra-frame prediction for the processing of the one macroblock by the second moving picture processing unit.

2. The functional block according to claim 1, wherein a result of processing of one macroblock of the plural adjacent macroblocks is selected in accordance with a prediction mode used for the intra-frame prediction of the one macroblock from the data related to the results of processing of the plural adjacent macroblocks by the first moving picture processing unit, which have been transferred from the memory unit prior to the processing start of the intra-frame prediction for the processing of the one macroblock of the second plural macroblocks by the second moving picture processing unit, and wherein the second moving picture processing unit executes the processing of the one macroblock of the second plural macroblocks using the selected result of processing.

3. The functional block according to claim 1, wherein the first moving picture processing unit and the second moving picture processing unit respectively include memories that store therein data related to the results of processing of macroblocks, and wherein the first moving picture processing unit and the second moving picture processing unit respectively use the data stored in the memories and related to the results of processing of the macroblocks upon intra-frame prediction for processing of succeeding macroblocks immediately following the macroblocks.

4. The functional block according claim 1, wherein the first moving picture processing unit and the second moving picture processing unit each include a cascade connection of a plurality of input/output interfaces respectively coupled to the plural functional subunits, wherein the input/output interfaces transfer data related to the results of processing of macroblocks by an associated one of the first moving picture processing unit and the second moving picture processing unit, and wherein an output of the cascade connection of the input/output interfaces of the first moving picture processing unit is coupled to an input of the cascade connection of the input/output interfaces of the second moving picture processing unit, an output of the cascade connection of the input/output interfaces of the second moving picture processing unit is coupled to an input of the memory unit via a second data path, and an output of the memory unit is coupled to an input of the cascade connection of the input/output interfaces of the first moving picture processing unit via a third data path.

5. The functional block according to claim 4, wherein the input/output interfaces discriminate whether corresponding subunits use the transferred data related to the results of processing of the macroblocks, and supply the data to the corresponding subunits when the subunits use the same.

6. The functional block according to claim 1, further comprising a controller which analyzes a bit stream containing the first plural macroblocks and the second plural macroblocks, and thereby supplies the first plural macroblocks to the first moving picture processing unit, and supplies the second plural macroblocks to the second moving picture processing unit.

7. The functional block according to claim 6, further comprising a direct memory access controller which transfers the bit stream between a storage device and the first and second moving picture processing units.

8. The functional block according to claim 1, wherein the functional subunits of the first moving picture processing unit and the second moving picture processing unit are comprised of common hardware resources usable in the video decoding and the video coding and supplied with an operation mode signal for instructing a system initialization sequence to operate the functional block as either a coding device or a decoding device, and each of the common hardware resources is operated as a device instructed by the operation mode signal in response to the instruction based on the operation mode signal.

9. The functional block according to claim 1, wherein the memory unit includes a line memory that stores therein the data corresponding to at least the one row, related to the results of processing of the first plural macroblocks arranged within the one row of the one picture, by the first moving picture processing unit.

10. A semiconductor integrated circuit including as a core, a functional block capable of executing at least any one of video coding and video decoding based on H. 264/AVC, comprising:

at least a first moving picture processing unit and a second moving picture processing unit capable of parallel operations; and a memory unit which is coupled to the first moving picture processing unit and the second moving picture processing unit and stores therein data related to results of processing by the first moving picture processing unit, wherein, when the first moving picture processing unit and the second moving picture processing unit perform the parallel operations, a data processing unit processed by each of the first moving picture processing unit and the second moving picture processing unit includes macroblocks having a plurality of sample numbers, wherein each of the first moving picture processing unit and the second moving picture processing unit includes pipeline connections of a plurality of functional subunits operated with timings different from one another in function and different in pipeline operation so as to execute a selected one of the video coding and the video decoding, wherein the functional block is operative to process a field picture and a coded frame picture, separately, wherein, when the functional block processes a top field or a bottom field of the field picture, the first moving picture processing unit sequentially processes first plural macroblocks arranged within one row of one picture, and the second moving picture processing unit sequentially processes second plural macroblocks arranged within another row of the one picture, different from the one row, and the timing to start the pipeline operation of the second moving picture processing unit is delayed by two or more time slots of the pipeline operation from the timing to start the pipeline operation of the first moving picture processing unit, and data related to results of processing of plural adjacent macroblocks of the first plural macroblocks, which are located in a neighborhood of one macroblock of the second plural macroblocks, by the first moving picture processing unit, are used upon intra-frame prediction for processing of the one macroblock of the second plural macroblocks by the second moving picture processing unit, wherein, when the functional block processes the coded frame picture, the first moving picture processing unit processes as data units respective sets of macroblock pairs of same rows in first plural macroblocks arranged within one row of one picture and second plural macroblocks arranged within a first succeeding row located immediately after the one row, and the second moving picture processing unit processes as data units respective sets of macroblock pairs of same rows in third plural macroblocks arranged within a second succeeding row located immediately after the first succeeding row, and fourth plural macroblocks arranged within a third succeeding row located immediately after the second succeeding row, and the timing to start the pipeline operation of the second moving picture processing unit is delayed by four or more time slots of the pipeline operation from the timing to start the pipeline operation of the first moving picture processing unit, and wherein the data related to the results of processing of at least the plural adjacent macroblocks by the first moving picture processing unit are transferred from the memory unit to the second moving picture processing unit prior to the start of processing for the intra-frame prediction for the processing of the one macroblock by the second moving picture processing unit.

11. The semiconductor integrated circuit according to claim 10, wherein a result of processing of one macroblock of the plural adjacent macroblocks is selected in accordance with a prediction mode used for the intra-frame prediction of the one macroblock from the data related to the results of processing of the plural adjacent macroblocks by the first moving picture processing unit, which have been transferred from the memory unit prior to the processing start of the intra-frame prediction for the processing of the one macroblock of the second plural macroblocks by the second moving picture processing unit, and wherein the second moving picture processing unit executes the processing of the one macroblock of the second plural macroblocks using the selected result of processing.

12. The semiconductor integrated circuit according to claim 10, wherein the first moving picture processing unit and the second moving picture processing unit respectively include memories that store therein the data related to the results of processing of macroblocks, and wherein the first moving picture processing unit and the second moving picture processing unit respectively use the data stored in the memories and related to the results of processing of the macroblocks upon intra-frame prediction for processing of succeeding macroblocks immediately following the macroblocks.

13. The semiconductor integrated circuit according to claim 10, wherein the first moving picture processing unit and the second moving picture processing unit each include a cascade connection of a plurality of input/output interfaces respectively coupled to the plural functional subunits, wherein the input/output interfaces transfer data related to the results of processing of macroblocks by an associated one of the first moving picture processing unit or the second moving picture processing unit, and wherein an output of the cascade connection of the input/output interfaces of the first moving picture processing unit is coupled to an input of the cascade connection of the input/output interfaces of the second moving picture processing unit, an output of the cascade connection of the input/output interfaces of the second moving picture processing unit is coupled to an input of the memory unit via a second data path, and an output of the memory unit is coupled to an input of the cascade connection of the input/output interfaces of the first moving picture processing unit.

14. The semiconductor integrated circuit according to claim 13, wherein the input/output interfaces discriminate whether corresponding subunits use the transferred data related to the results of processing of the macroblocks, and the data are supplied to the corresponding subunits when the subunits use the same.

15. The semiconductor integrated circuit according to claim 10, further comprising a controller which analyzes a bit stream containing the first plural macroblocks and the second plural macroblocks and thereby supplies the first plural macroblocks to the first moving picture processing unit and supplies the second plural macroblocks to the second moving picture processing unit.

16. The semiconductor integrated circuit according to claim 15, further comprising a direct memory access controller which transfers the bit stream between a storage device and the first and second moving picture processing units.

17. The semiconductor integrated circuit according to claim 10, wherein the functional subunits of the first moving picture processing unit and the second moving picture processing unit are comprised of common hardware resources usable in the video decoding and the video coding and supplied with an operation mode signal for instructing a system initialization sequence to operate the functional block as either a coding device or a decoding device, and each of the common hardware resources is operated as a device instructed by the operation mode signal in response to the instruction based on the operation mode signal.

18. The semiconductor integrated circuit according to claim 10, wherein the memory unit includes a line memory that stores therein the data corresponding to at least the one row, related to the results of processing of the first plural macroblocks arranged within the one row of the one picture, by the first moving picture processing unit.

* * * * *